(12) United States Patent
Bailey et al.

(10) Patent No.: US 7,330,797 B2
(45) Date of Patent: Feb. 12, 2008

(54) APPARATUS AND METHOD FOR MEASURING SETTLEMENT OF SOLIDS IN A MULTIPHASE FLOW

(75) Inventors: Timothy J. Bailey, Longmeadow, MA (US); Mark R. Fernald, Enfield, CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 11/592,915

(22) Filed: Nov. 3, 2006

(65) Prior Publication Data

US 2007/0083340 A1  Apr. 12, 2007

Related U.S. Application Data

(63) Continuation-in-part of application No. 11/077,709, filed on Mar. 10, 2005, now abandoned.

(60) Provisional application No. 60/733,575, filed on Nov. 3, 2005, provisional application No. 60/552,164, filed on Mar. 10, 2004.

(51) Int. Cl.
*G01F 23/00* (2006.01)
(52) U.S. Cl. ............................ 702/50; 702/45; 702/100
(58) Field of Classification Search .................. 702/45, 702/50, 100
See application file for complete search history.

(56) References Cited

U.S. PATENT DOCUMENTS

| | | | |
|---|---|---|---|
| 4,248,085 A | 2/1981 | Coulthard | ................ 73/861.06 |
| 4,445,389 A | 5/1984 | Potzick et al. | ........... 73/861.27 |
| 4,561,310 A | 12/1985 | Barnard et al. | |
| 4,896,540 A | 1/1990 | Shakkottai et al. | ...... 73/861.02 |

(Continued)

FOREIGN PATENT DOCUMENTS

EP   1 186 868   3/2002

(Continued)

OTHER PUBLICATIONS

Sonar-Based Volumetric Flow Meter for Pulp and Paper Applications—By: Daniel L. Gysling & Douglas H. Loose—Dec. 13, 2002.

(Continued)

*Primary Examiner*—John Barlow
*Assistant Examiner*—Jonathan Moffat
(74) *Attorney, Agent, or Firm*—Michael Grillo

(57) ABSTRACT

A method and apparatus for measuring a parameter of a flow passing through a pipe is provided, wherein the apparatus includes at least two spatial array of sensors disposed at different axial locations along the pipe, wherein each of the sensors provide a signal indicative of unsteady pressure created by coherent structures convecting with the flow within the pipe at a corresponding axial location of the pipe. The apparatus also includes a signal processor configured to determine the flow rate at the circumference location of each sensor array in response to the respective measured unsteady pressures. The signal processor compares the velocity of the flow at each respective location and provides a signal indicative the presence of solids settled at the bottom of the pipe and/or the level of the settled solids in the pipe, in response to an uncharacteristic increase in the velocity of a lower portion of the flow in comparison to the velocity measured above the lower portion of the flow.

37 Claims, 12 Drawing Sheets

U.S. PATENT DOCUMENTS

| | | | |
|---|---|---|---|
| 5,040,415 A | 8/1991 | Barkhoudarian | 73/861.03 |
| 5,083,452 A | 1/1992 | Hope | 73/61 R |
| 5,367,911 A | 11/1994 | Jewell et al. | 73/861.08 |
| 5,398,542 A | 3/1995 | Vasbinder | 73/40.5 |
| 5,591,922 A | 1/1997 | Segeral et al. | 73/861.04 |
| 5,708,211 A | 1/1998 | Jepson et al. | |
| 5,770,805 A | 6/1998 | Castel | 73/861.04 |
| 5,770,806 A | 6/1998 | Hiismaki | 73/861.29 |
| 5,856,622 A | 1/1999 | Yamamoto et al. | 73/861.28 |
| 5,929,342 A | 7/1999 | Thompson et al. | |
| 5,948,959 A | 9/1999 | Peloquin | 73/1.83 |
| 6,202,494 B1 | 3/2001 | Riebel et al. | 73/861.29 |
| 6,354,147 B1 | 3/2002 | Gysling et al. | |
| 6,386,018 B1 | 5/2002 | Letton et al. | |
| 6,397,683 B1 | 6/2002 | Hagenmeyer et al. | 73/861.18 |
| 6,412,353 B1 | 7/2002 | Kleven et al. | |
| 6,435,030 B1 | 8/2002 | Gysling et al. | |
| 6,450,037 B1 | 9/2002 | McGuinn | |
| 6,526,358 B1* | 2/2003 | Mathews et al. | 702/51 |
| 6,536,291 B1 | 3/2003 | Gysling et al. | |
| 6,587,798 B2 | 7/2003 | Kersey | |
| 6,601,005 B1 | 7/2003 | Eryurek et al. | |
| 6,609,069 B2 | 8/2003 | Gysling | |
| 6,691,584 B2 | 2/2004 | Gysling et al. | |
| 6,782,150 B2 | 8/2004 | Davis et al. | |
| 6,837,332 B1 | 1/2005 | Rodney | |
| 6,889,562 B2 | 5/2005 | Gysling et al. | |
| 6,898,541 B2 | 5/2005 | Gysling et al. | |
| 6,959,604 B2 | 11/2005 | Bryant | |
| 7,032,432 B2 | 4/2006 | Gysling et al. | |
| 2002/0011120 A1 | 1/2002 | Huang | |
| 2002/0095263 A1* | 7/2002 | Gysling | 702/45 |
| 2002/0129662 A1 | 9/2002 | Gysling et al. | |
| 2003/0154036 A1 | 8/2003 | Gysling et al. | |
| 2004/0069069 A1 | 4/2004 | Croteau | |
| 2004/0144182 A1 | 7/2004 | Gysling et al. | |
| 2004/0168522 A1 | 9/2004 | Bailey et al. | |
| 2004/0168523 A1 | 9/2004 | Bailey et al. | |
| 2004/0199340 A1 | 10/2004 | Gysling et al. | |
| 2004/0226386 A1 | 11/2004 | Croteau et al. | |
| 2004/0231431 A1 | 11/2004 | Bailey et al. | |
| 2005/0005912 A1 | 1/2005 | Gysling et al. | |
| 2005/0005913 A1 | 1/2005 | Curry et al. | |
| 2005/0011283 A1 | 1/2005 | Gysling et al. | |
| 2005/0011284 A1 | 1/2005 | Davis et al. | |
| 2005/0033545 A1* | 2/2005 | Gysling | 702/138 |
| 2005/0125166 A1 | 6/2005 | Davis et al. | |
| 2005/0125169 A1* | 6/2005 | Loose | 702/45 |
| 2005/0159904 A1 | 7/2005 | Loose et al. | |
| 2007/0022824 A1 | 2/2007 | Bailey | |

FOREIGN PATENT DOCUMENTS

| | | |
|---|---|---|
| GB | 2 282 931 | 4/1995 |
| WO | WO 93/14382 | 7/1993 |
| WO | WO 1186868 | 3/2002 |
| WO | WO 04/065912 | 8/2004 |

OTHER PUBLICATIONS

Sonar Based Volumetric Flow Meter for Chemical and Petrochemical Applications—By: Daniel L. Gysling & Douglas H. Loose—Feb. 14, 2003.

Sonar Based Volumetric Flow and Entrained Air Measurement for Pulp and Paper Applications—By: Daniel L. Gysling & Douglas H. Loose—Jan. 24, 2003.

ICASE Piezoelectric Polymers—Langley Research Center—Dec. 2001.

Piezo Film Sensors Technial Manual—Measurement Specialties, Inc.—Apr. 2, 1999.

"New Flowmeter Principle" —By: Walt Boyers—Published in Flow Control Magazine—Oct. 2003 Issue.

Mass Fraction Measurements in Multiphase Flows using a Clamp-on PVDF Array—Johan Carlson, IEEE Ultrasonics Symposium Proceedings, vol. 1 Apr. 18, 2001, pp. 471-474.

"Noise and Vibration Control Engineering Principles and Applications", Leo L. Beranek and Istvan L. Ver, A. Wiley Interscience Publication, pp. 537-541, Aug. 1992.

"Two Decades of Array Signal Processing Research", The Parametric Approach, H. Krim and M. Viberg, IEEE Signal Processing Magazine, Jul. 1996, pp. 67-94.

"Development of an array of pressure sensors with PVDF film, Experiments in Fluids 26", Jan. 8, 1999, Springer-Verlag.

Heywood, NI and D C-H Cheng,"Flow in Pipes Part 2: Multiphase Flow, " Phys. Technol., vol. 15, 1984, pp. 291-300 and 314.

"Viscous Attenuation of Acoustic Waves in Suspensions" by R.L. Gibson, Jr. and M.N. Toksoz, 1989 Acoustical Society of America, May 1989, pp. 1925-1934.

\* cited by examiner

APPARATUS AND METHOD FOR MEASURING SETTLEMENT OF SOLIDS IN A MULTIPHASE FLOW

CROSS-REFERENCE TO RELATED PATENT APPLICATIONS

The present application claims the benefit of U.S. Provisional Patent Application Ser. No. 60/733,575, filed on Nov. 3, 2005; and is a continuation in part of U.S. patent application Ser. No. 11/077,709, filed on Mar. 10, 2005, now abandoned, which claimed the benefit of U.S. Provisional Patent Application No. 60/552,164, filed on Mar. 10, 2004, which are incorporated herein by reference in their entirety.

TECHNICAL FIELD

This invention relates to a method and apparatus for measuring parameters of a multiphase flow comprising a mixture of solids and fluids (e.g., gas and liquid) such as velocity, level of stratification, volumetric flow rate, presence of the settlement of solids, and/or level of the settlement of solids within a pipe.

BACKGROUND

Many industrial fluid flow processes involve the transportation of a high mass fraction of high density, solid materials through a pipe. For example, a process known as hydrotransport is used in many industries to move solids from one point to another point. In this process, water is added to the solids and the resulting mixture is pumped through typically large diameter pipes.

Operation of a hydrotransport line typically involves some degree of stratification, where flow velocity near the bottom of the pipe is less than flow velocity near the top of the pipe. The level of stratification in this flow (i.e., the degree of skew in the velocity profile from the top of the pipe to the bottom of the pipe is dependent on numerous material and process parameters, such as flow rate, density, pipe size, particle size, and the like. If the level of stratification extends to the point where deposition velocity is reached, the solids begin to settle to the bottom of the pipe, and if the condition is undetected and persists, complete blockage of the pipe can occur, resulting in high costs associated with process downtime, clearing of the blockage, and repair of damaged equipment.

To reduce the chance of costly blockage formation, current practice involves operating the pipeline at a flow velocity significantly above the critical deposition velocity. However, this technique has two significant drawbacks due to operation at these higher velocities: 1) it causes higher energy usage due to higher friction losses, and 2) it causes higher pipe wear due to abrasion between the solids and the pipe inner surface. This technique may also be undesirable due to high water consumption. A reliable means of measuring parameters such as velocity, level of stratification, volumetric flow rate, presence of the settlement of solids, and/or level of the settlement of solids within a pipe would enable the pipeline to be operated at a lower velocity, resulting in energy savings and lower pipe wear.

Various technologies exist for measuring the physical parameters of an industrial flow process, wherein such physical parameters may include, for example, volumetric flow rate, composition, consistency, density, and mass flow rate. While existing technologies may be well-suited for aggressive, large diameter flows, these technologies may be unsuitable for stratified flows, which can adversely affect accuracy in measuring the physical parameters of the flow.

Several non-commercial techniques for determining the onset of solids deposition in slurry pipelines are described in recent literature. For example, one technique uses a commercial clamp-on ultrasonic flow meter, operating in a Doppler mode, with coded transmissions and cross-correlation detection, wherein the detection point for the meter is set at a certain pipe level, e.g., 10% above the pipe invert (i.e., the pipe bottom for horizontal pipes). Cross-correlation of a time-gated ultrasonic return signal enables detection of reflected signals only from the set point. A decrease in coherence between the transmitted and received signals indicates unsteady flow conditions due to solids deposition.

Another existing non-commercial technique measures the apparent electrical resistivity of the slurry near the pipe invert, with a change in resistivity indicating the formation of a solids bed. This technique was deemed to be not very successful due to poor repeatability, as well as various other problems.

Still another non-commercial technique utilizes self-heating thermal probes which are mounted in the slurry. A moving slurry removes temperature from the probes, while a stationary solids bed around the probe causes heat to build up. Thus a temperature rise is indicative of solids deposition. While this technique is promising, it is an invasive technique requiring the thermal probes to be placed in the pipe. Such invasive techniques have drawbacks in that they require the process to be stopped to allow for installation and maintenance of the probes.

Still yet another technique involves the installation of a short pipe with a slightly larger inside diameter, where a stationary solids bed is allowed to form and is maintained as a control while the main pipeline is operated with no solids bed. The control solids bed is then monitored by one or more of the techniques described above. An increase in the height of the control bed then indicates the likely formation of a sliding bed in the main pipeline, which is a precursor of a stationary bed and eventual blockage. When the control solids bed height increases beyond a certain limit, the flow rate may be increased to avoid solids deposition.

Thus, there remains a need for a method and apparatus for measuring parameters of a stratified flow, such as velocity, level of stratification, volumetric flow rate, presence of the settlement of solids, and/or level of the settlement of solids within a pipe.

SUMMARY OF THE INVENTION

An apparatus for measuring a parameter of a flow passing through a pipe is provided, wherein the apparatus includes a first spatial array of at least two sensors disposed at different axial locations along the pipe, each of the sensors in the first array providing a first signal indicative of unsteady pressure created by coherent structures convecting with a portion of the flow passing through a first portion of the pipe. The apparatus also includes a second spatial array of at least two sensors disposed at different axial locations along the pipe, each of the sensors in the second array providing a second signal indicative of unsteady pressure created by coherent structures convecting with a portion of the flow passing through a second portion of the pipe, the first portion of the pipe being located above the second portion of the pipe. Additionally, the apparatus includes at least one signal processor configured to determine a first velocity of the flow passing through the first portion of the pipe using the first signals, determine a second velocity of the flow passing through the second portion of the pipe using the second signals, and compare the first and second velocities to determine the parameter of the flow.

Furthermore, an apparatus for measuring a parameter of a flow passing through a pipe is provided, wherein the apparatus includes at least one spatial array of sensors disposed at different axial locations along the pipe, wherein each of the sensors provide a signal indicative of unsteady pressure created by coherent structures convecting with the flow within the pipe at a corresponding axial location of the pipe and a signal processor configured to identify a greater convection velocity and a location of the greater convection velocity, wherein the greater convection velocity is indicative of stratification of the flow and wherein the location of the greater convection velocity is indicative of a level of the stratification of the flow.

Moreover, a method for measuring a parameter of a flow passing through a pipe using an apparatus is provided, wherein the apparatus includes a first spatial array of at least two sensors disposed at different axial locations along the pipe, each of the sensors in the first array providing a first signal indicative of unsteady pressure created by coherent structures convecting with a portion of the flow passing through a first portion of the pipe, a second spatial array of at least two sensors disposed at different axial locations along the pipe, each of the sensors in the second array providing a second signal indicative of unsteady pressure created by coherent structures convecting with a portion of the flow passing through a second portion of the pipe, the first portion of the pipe being located above the second portion of the pipe and at least one signal processor. The method includes determining a first velocity of the flow passing through the first portion of the pipe using the first signals, determining a second velocity of the flow passing through the second portion of the pipe using the second signals, and comparing the first and second velocities to determine the parameter of the flow.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike:

FIG. 1b is schematic diagram of a processing unit of the apparatus of FIG. 1a.

FIG. 2 depicts a transverse (radial) cross-section of the apparatus of FIG. 1a.

FIG. 3 depicts a plot of the normalized velocity for the top and bottom arrays in the apparatus of FIG. 1a.

DETAILED DESCRIPTION

As described in commonly-owned U.S. Pat. No. 6,609, 069, filed on Nov. 28, 2001, U.S. Pat. No. 6,889,562, filed on Nov. 8, 2001, and U.S. patent application Ser. No. 10/712,833, filed on Nov. 12, 2003, all of which are incorporated herein by reference in their entireties, unsteady pressures along a pipe caused by coherent structures (e.g., turbulent eddies and/or vortical disturbances) that convect with a fluid flowing in the pipe, contain useful information regarding parameters of the fluid. The present invention provides various means for using this information to measure parameters of a multiphase flow, such as, for example, velocity, level/degree of stratification, volumetric flow rate, and the presence and level of particles settled on the wall of the pipe. The multi-phase flow or mixture may be a two-phase liquid/vapor mixture, a solid/vapor mixture, a liquid/liquid mixture or a solid/liquid mixture, gas entrained liquid or even a three-phase mixture, having any combination liquid/solid/gas including a liquid/liquid/solid/gas combination. The present invention is particularly directed to a multi-phase mixture has a solid phase which may settle within a multiphase flow against the wall of a pipe. One will appreciate that the solid may be in the form of particles (e.g., sand), rocks, fiber or any other material that may settle within the pipe.

Figure 1B:
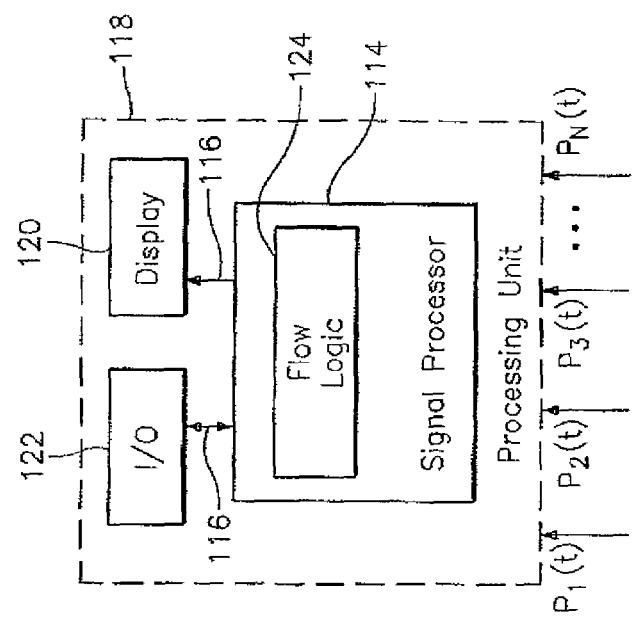
Figure 1A:
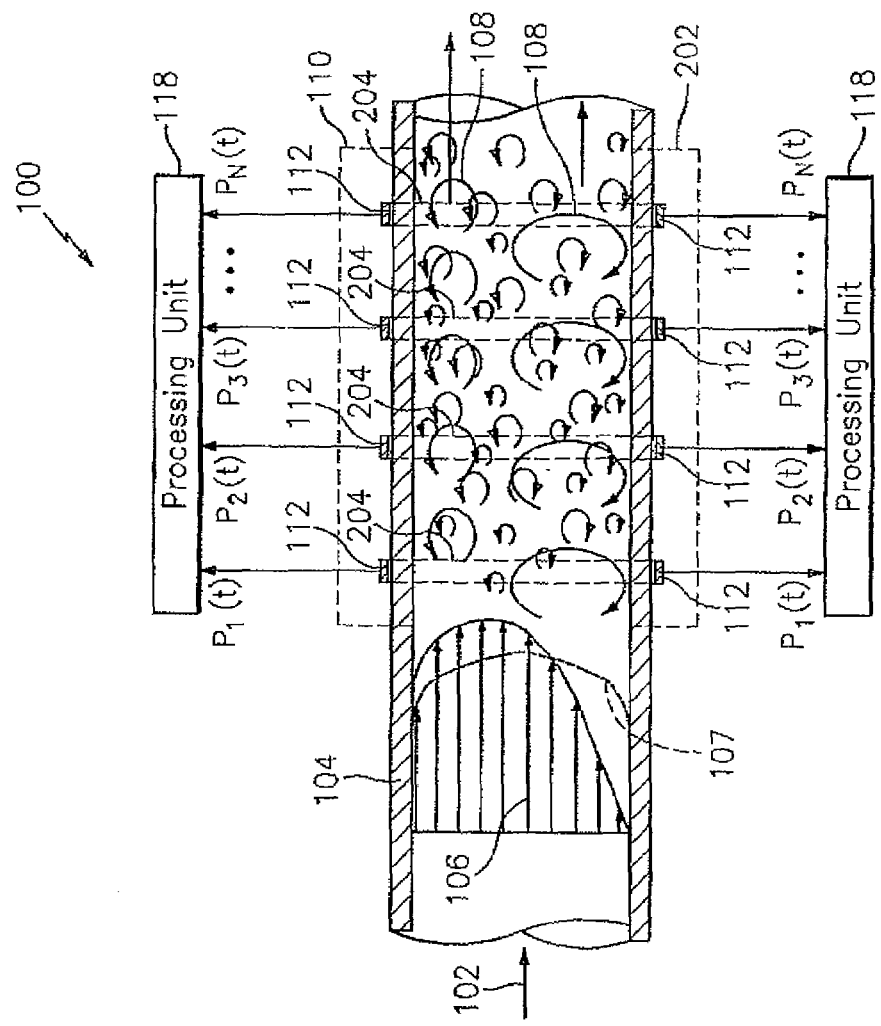
FIG. 1a is schematic diagram of an apparatus for determining at least one parameter associated with a stratified fluid flowing in a pipe, in accordance with the present invention.

Referring to FIG. 1a, an apparatus 100 for measuring at least one parameter associated with a flow 102 flowing within a duct, conduit or other form of pipe 104, is shown, wherein the parameter of the flow 102 may include, for example, at least one of: a velocity of the flow 102, a volumetric flow rate of the flow 102, a level of stratification of the flow 102, and the presence and level (or depth) of particles settled on the wall of the pipe 104. In FIG. 1a, the multiphase flow 102 is depicted as being stratified, where a velocity profile 106 of the flow 102 is skewed from the top of the pipe 104 to the bottom of the pipe 104, as may be found in industrial fluid flow processes involving the transportation of a high mass fraction of high density, solid materials through a pipe 104 where the larger particles travel more slowly at the bottom of the pipe 104. For example, the flow 102 maybe part of a hydrotransport process.

Also shown in FIG. 1a, a velocity profile 107 for a non-stratified, Newtonian flow operating in the turbulent regime at Reynolds numbers above about 100,000 is depicted for illustrative purposes. Furthermore, the coherent structures 108 in the non-stratified, turbulent, Newtonian flow 102 exhibit very little dispersion, and thus the flow 102 has a velocity profile 107 that is uniformly developed from the top of the pipe 104 to the bottom of the pipe 104. In other words, the speed of convection of the coherent structures 108 is not strongly dependent on the physical size of the coherent structures 108. It should be appreciated that as used herein, dispersion describes the dependence of convection velocity with wavelength, or equivalently, with temporal frequency and flows for which all wavelengths convect at a constant velocity are termed "non-dispersive". For turbulent, Newtonian flow, there is typically not a significant amount of dispersion over a wide range of wavelength-to-diameter ratios.

Sonar-based flow measurement devices, such as, for example, the device described in aforementioned U.S. Pat. No. 6,609,069 to Gysling, have advantageously applied the non-dispersive characteristic of turbulent, Newtonian flow in accurately determining flow rates. However, for stratified flows such as those depicted in FIG. 1a, some degree of dispersion is exhibited. In other words, the coherent structures 108 convect at velocities that are dependent upon their size, with larger length scale coherent structures 108 tending to travel more slowly than smaller length scale structures 108. As a result, some of the underlying assumptions associated with prior sonar-based flow measurement devices, namely that the speed of convection of the coherent structures 108 is not strongly dependent on the physical size of the structures 108, are affected by the presence of stratification.

As shown in FIG. 1a and FIG. 1b, which depicts a transverse (axial) cross-section of the apparatus 100, the apparatus 100 determines the presence and/or level of settlement of particles on the bottom of the pipe 104. The apparatus 100 includes a first spatial array 110 of at least two sensors 112 disposed at different axial locations $x_1 \ldots x_N$ along the top of the pipe 104. It should be appreciated that the pressure generated by the convective pressure disturbances (e.g., eddies 108) may be measured through strained-based sensors 112 and/or pressure sensors 112. Each of the sensors 112 provides a pressure signal P(t) indicative of unsteady pressure created by coherent structures 108 convecting with a portion of the flow 102 near the top of the pipe 104. The apparatus 200 further includes a second spatial array 202 of at least two sensors 112 disposed at different axial locations $x_1 \ldots x_N$ along the bottom of the pipe 104. Each of the sensors 112 in the second spatial array 202 provides a pressure signal P(t) indicative of unsteady pressure created by coherent structures 108 convecting with a portion of the flow 102 near the bottom of the pipe 104.

The sensors 112 from each array 110 and 202 provide analog pressure time-varying signals $P_1(t), P_2(t), P_3(t) \ldots P_N(t)$ to one or more processing units 118 to determine flow velocity of each array. The signal processor 114 applies the pressure signals from the sensors 112 in the array 110 to flow logic 124 executed by the signal processor 114 to determine the velocity of the flow 102 near the top of the pipe 104. The signal processor 114 applies the pressure signals from the sensors 112 in the array 202 to flow logic 124 executed by the signal processor 114 to determine the velocity of the flow 102 near the bottom of the pipe 104.

In the embodiment shown, each of the sensors 112 is formed by a strip of piezoelectric material such as, for example, the polymer, polarized fluoropolymer, PVDF, which measures the strain induced within the pipe 104 due to the coherent structures 108 convecting with the flow 102. The sensors 112 can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The strips of piezoelectric film material forming the sensors 112 along each axial location $x_1 \ldots x_N$ of the pipe 104 may be adhered to the surface of a steel strap 204 (e.g., a hose clamp) that extends around and clamps onto the outer surface of the pipe 104. The invention further contemplates that the strips of piezoelectric film material mat be attached or adhered to the outer surface of the pipe 104 by an adhesive, such as epoxy. As discussed hereinafter, other types of sensors 112 and other methods of attaching the sensors 112 to the pipe 104 may be used.

Figure 2:
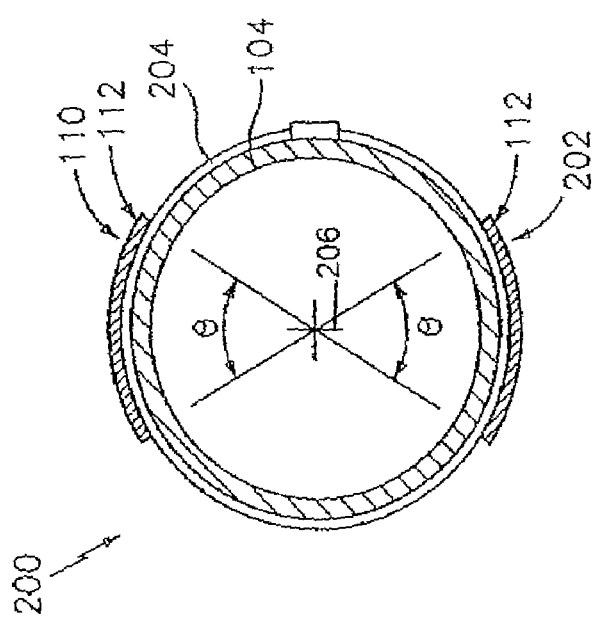

In the embodiment shown, the sensors 112 extend over an arcuate outer surface of the pipe 104 defined by the angle θ (FIG. 2), which is centered in the pipe 104 on a vertical line 206. For example, each of the sensors 112 may extend about ¼ of the circumference of the pipe 104. Because the sensors 112 do not extend across the side surfaces of the pipe 104, and because the sensors 112 tend to sense local disturbances within the flow 102, the sensors 112 sense coherent structures 108 convecting with a portion of the flow 102 near the top or bottom of the pipe 104, which will be described in greater detail hereinafter. Accordingly, as the size of the sensors 112 are decreased (i.e., as the angle θ is decreased), the unsteady pressures sensed by the sensors 112 more accurately indicate the nominal flow velocity of the portion of the flow 102 near the top or bottom of the pipe 104. However, the degree of accuracy provided by decreasing the size of the sensors 112 is offset by the decrease in signal strength provided by the sensors 112. Therefore, the size of the sensors 112 (i.e., the angle θ used) is dependent at least on the degree of accuracy desired and the strength of the signals $P_1(t), P_2(t), P_3(t) \ldots P_N(t)$ required by the signal processor 114.

While the apparatus 100 is shown as including four sensors 112, it is contemplated that the array 110 of sensors 112 may include two or more sensors 112, each providing a pressure signal P(t) indicative of the unsteady pressure within the pipe 104 at a corresponding axial location X of the pipe 104. For example, the apparatus may include 2, 3, 4, 5, 6, 7, 8, 9, 10, 11, 12, 13, 14, 15, 16, 17, 18, 19, 20, 21, 22, 23, or 24 sensors 112. Generally, the accuracy of the measurement improves as the number of sensors 112 in the array 110 increases, wherein the degree of accuracy provided by the greater number of sensors 112 may be offset by the increase in complexity and time for computing the desired output parameter of the flow. Therefore, the number of sensors 112 used is dependent at least on the degree of accuracy desired and the desire update rate of the output parameter provided by the apparatus 100.

The signals $P_1(t) \ldots P_N(t)$ provided by the sensors 112 in the array 110 are processed by the signal processor 114, which may be part of a larger processing unit 118. For example, the signal processor 114 may be a microprocessor and the processing unit 118 may be a personal computer or other general purpose computer. It is contemplated that the signal processor 114 may be any one or more analog or digital signal processing devices for executing programmed instructions, such as one or more microprocessors or application specific integrated circuits (ASICS), and may include memory for storing programmed instructions, set points, parameters, and for buffering or otherwise storing data.

The signal processor 114 may output the one or more parameters 116 to a display 120 or another input/output (I/O) device 122, wherein the I/O device 122 may also accept user input parameters. The I/O device 122, display 120, and signal processor 114 unit may be mounted in a common housing, which may be attached to the array 110 by a flexible cable, wireless connection, or the like. The flexible cable may also be used to provide operating power from the processing unit 118 to the array 110 if necessary.

The processing unit 118 may provide a signal or signals from the I/O device 122 to activate an audible or visual alarm or indicator which is indicative of a condition of the multiphase fluid flow 102 associated with the flow velocity, level of stratification, presence of settlement of solids (e.g., sanding), and/or the level of settlement of solids on the bottom of the pipe 116. In addition, the user may control a flow process in response to any one of the measured parameters 116. The output signal from the processing unit 118 may be used to control the flow rate of the multiphase fluid, the composition (phase fraction) of the fluid, and/or the chemicals or additives added to the fluid by controlling a pump(s) and/or valve(s) (or other processes control means) in response to any one or more of the parameters 116 measured by the apparatus 100, 200, 301, and 400.

Figure 13:
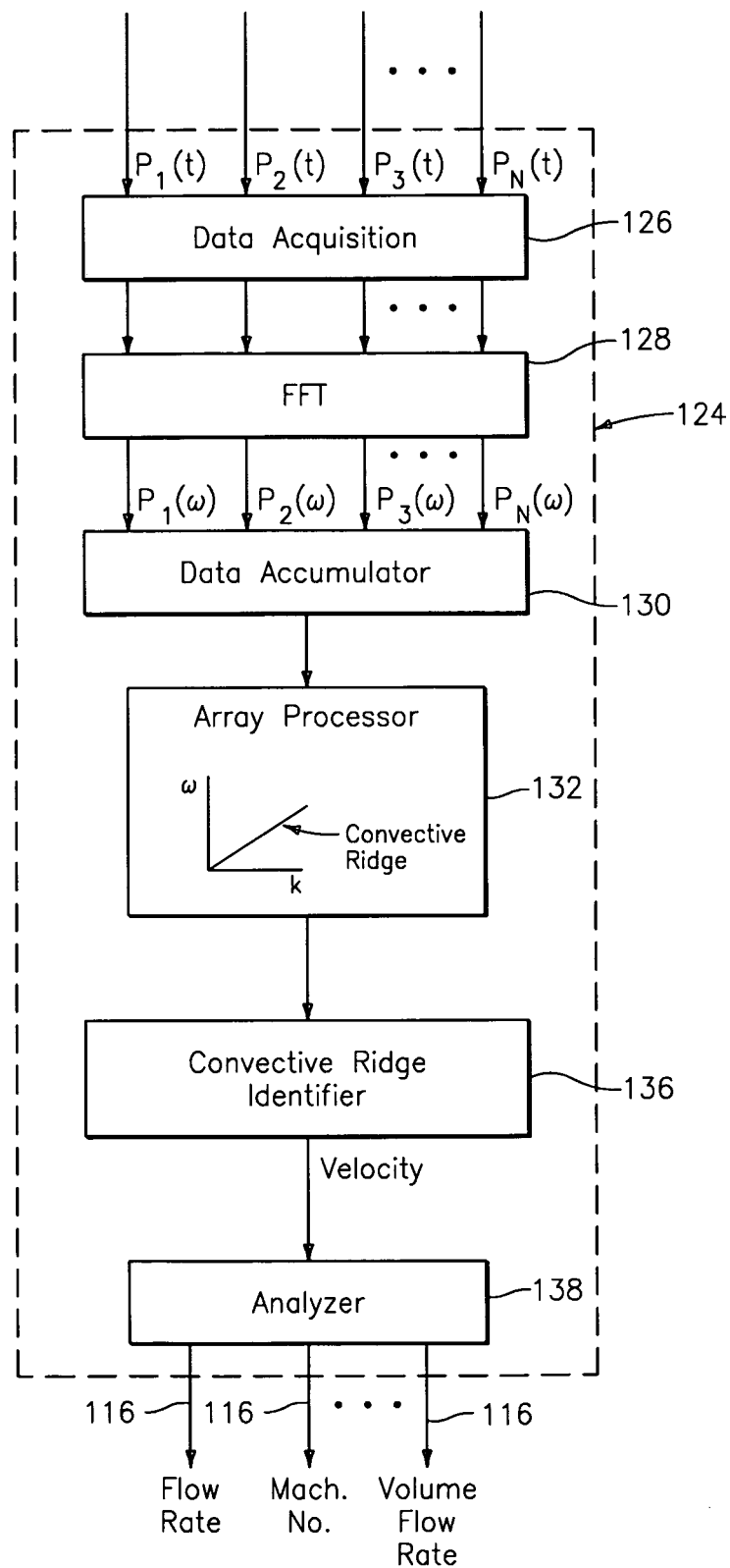
FIG. 13 is a block diagram of a flow logic used in the apparatus of the present invention.
Figure 15:
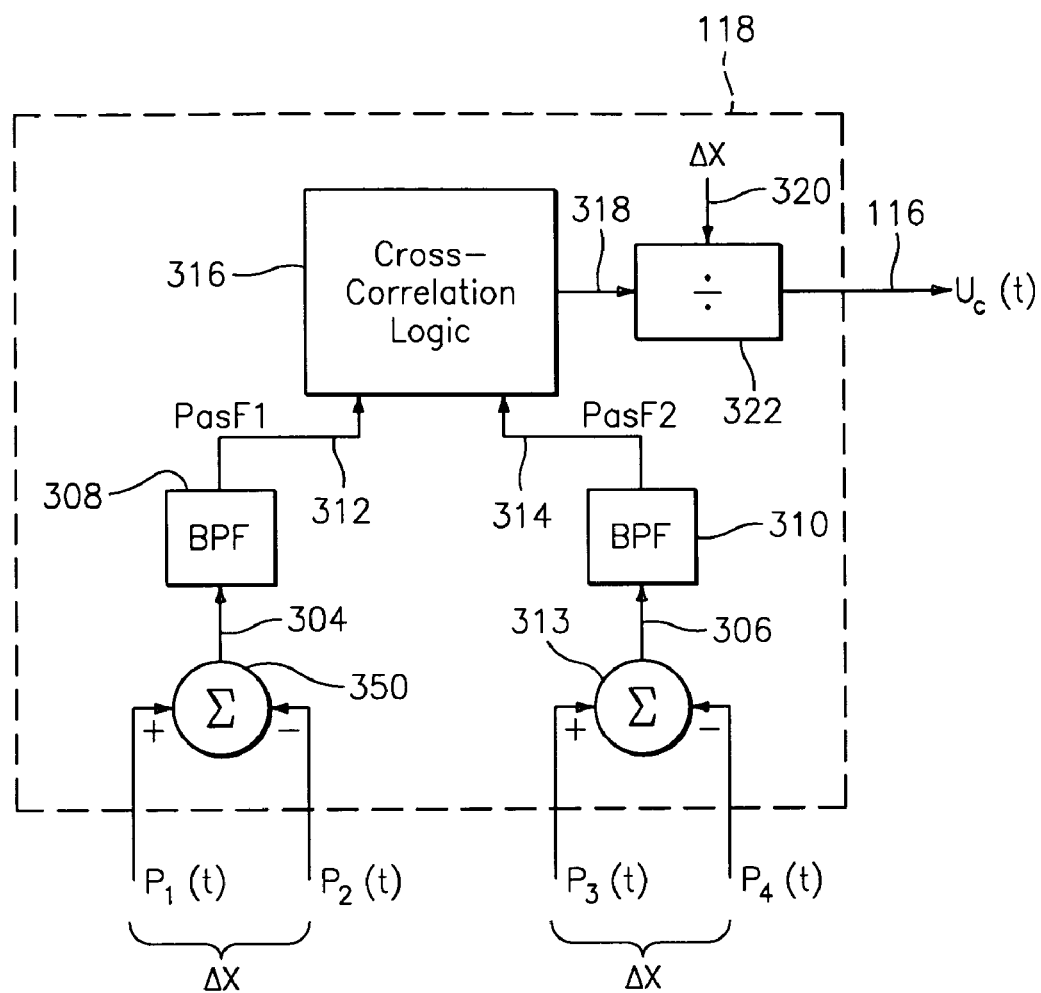
FIG. 15 is a block diagram of an apparatus for measuring the vortical field of a process flow within a pipe, in accordance with the present invention.

To determine the one or more parameters 116 of the flow 102, the signal processor 114 applies the data from the sensors 112 to a flow logic 124 executed by the signal processor 114. Referring to FIGS. 13 and 15, an example of the flow logic 124 is shown. Some or all of the functions within the flow logic 124 may be implemented in software (using a microprocessor or computer) and/or firmware, or may be implemented using analog and/or digital hardware, having sufficient memory, interfaces, and capacity to perform the functions described herein.

Figure 3:
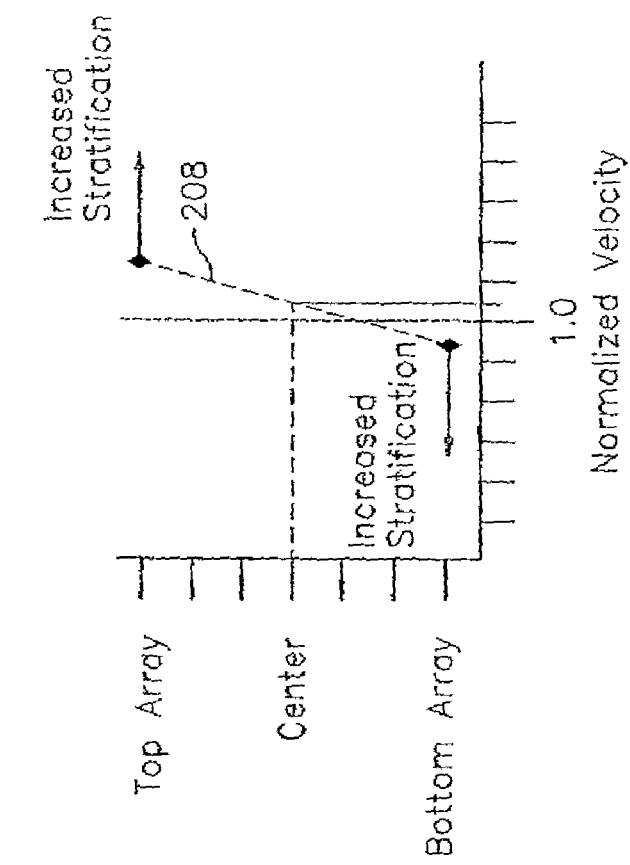

FIG. 3 depicts a plot of the normalized velocity for the top and bottom arrays 110 and 202. The ratio of the velocities near the top and bottom of the pipe 104 correlates to the level of stratification of the flow 102. Under conditions where there is no stratification, flow near the top and bottom of the pipe 104 (and the coherent structures 108 convecting with the flow) will travel at approximately the same velocity. As the level of stratification increases, the top array 110 will measure a higher normalized velocity and the bottom array 202 will measure a lower normalized velocity. Thus, by comparing the velocities near the top and bottom of the pipe 104, the level of stratification of the flow 102 can be determined.

The velocities near the top and bottom of the pipe 104 can also be used to estimate the nominal velocity of the flow 102, which, in turn, may be used to determine the volumetric flow rate of the flow 102. For example, nominal velocity may be determined using an average of the two velocities or some other ratio of the two velocities, wherein the ratio is dependent on the level of stratification (or difference between the two velocities). In another example, as shown in FIG. 3, the velocities near the top and bottom of the pipe 104 may be plot as a function of the distance between the top and bottom arrays 110, 202. In this example, the distance between the top and bottom arrays 10, 202 is approximately equal to the diameter of the pipe 104, and each increment on the x-axis represents some portion of this distance. The velocities at the top and bottom of the pipe 104 define a straight line 208, which has a slope that changes with the level of stratification. Using this straight line 208, the velocities at different distances between the top and bottom of the pipe 104 can be estimated, and the velocity at the appropriate pipe location can be used as the nominal velocity. In the example shown, velocity at the center of the pipe 104 (mid-way between the top and bottom arrays 110, 202) is estimated.

Figure 4:
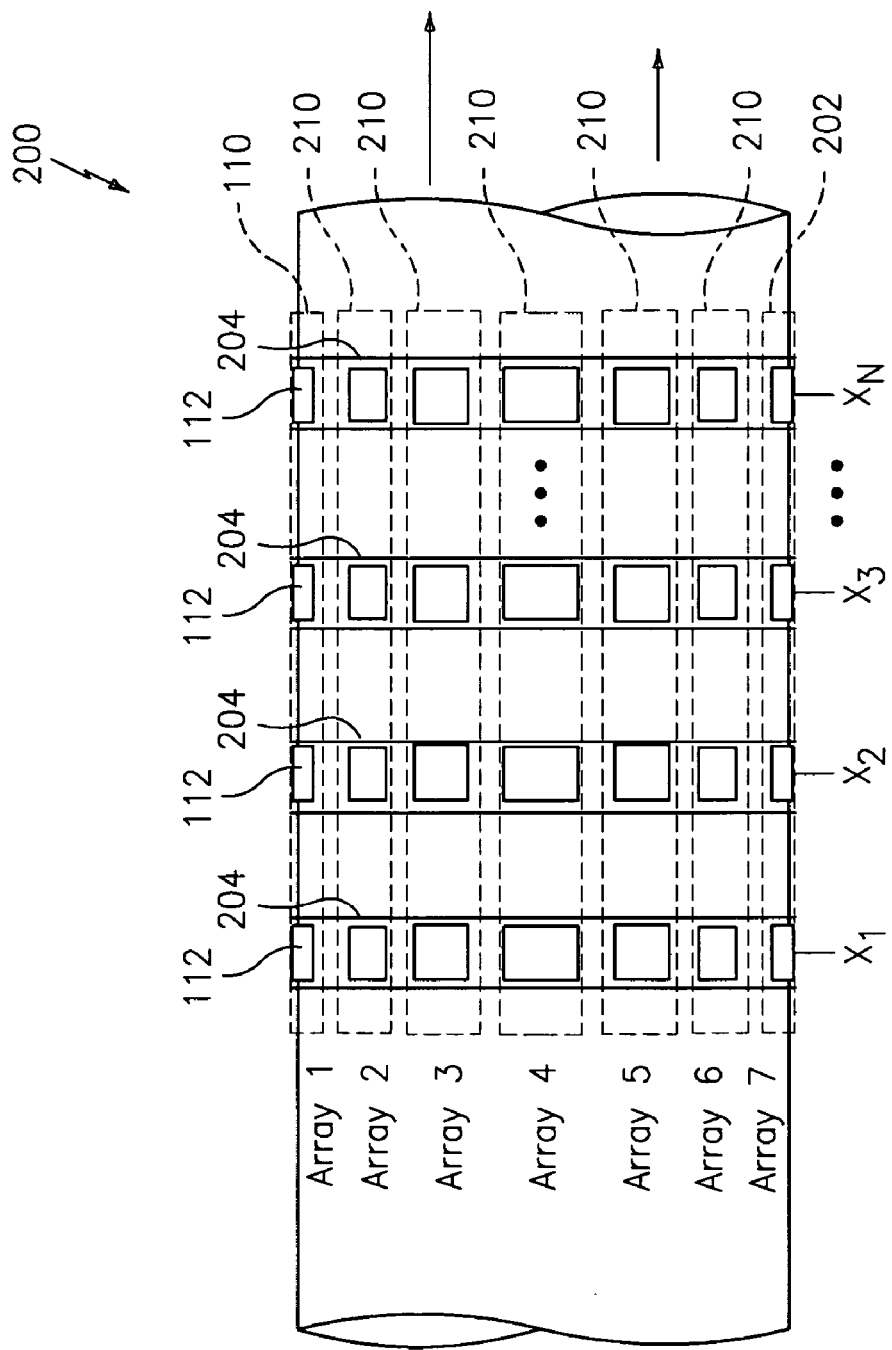
FIG. 4 depicts a longitudinal cross-section of an alternative embodiment of the present invention.
Figure 5:
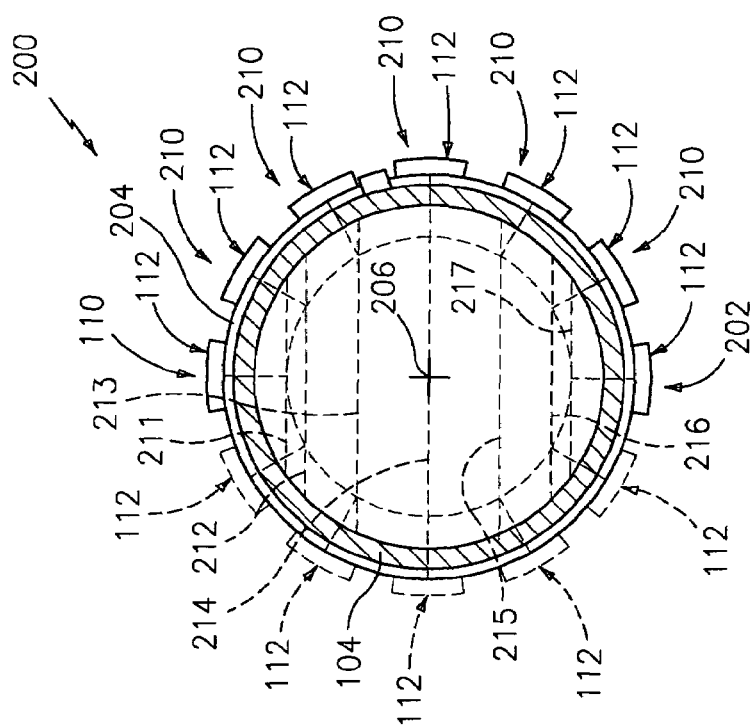
FIG. 5 depicts a transverse (radial) cross-section of the embodiment of FIG. 4.

The presence of solids or particles within the multiphase mixture 102 may be determined in the embodiment shown in FIGS. 1a-3. Knowing and understanding the settling characteristic of the solids in the multiphase mixture, comparison of the velocity at the top of the pipe and the velocity at the bottom of the pipe can provide an indication of settling (or sanding). The comparison of the upper and lower velocities may provide an indication of an uncharacteristic increase of the velocity of the bottom portion of the flow 102 when compared to the velocity of the top portion of the flow 102. Detection of this uncharacteristic flow change between the upper and lower portions of the flow provides an indication of the presence of settled solids in the bottom of the pipe. Unfortunately with only two sensor arrays disposed at the top and bottom of the pipe 104, a measured indication of the level of the settled solids is difficult if not possible. However, as will be shown in FIG. 12, it is possible to provide this measurement when the two arrays are disposed closer to each other. FIG. 4 depicts a side elevation view of an apparatus 200 embodying the present invention similar to the apparatus 100 of FIGS. 1a-2. The apparatus 200 further includes at least one additional spatial array 210 of sensors 112 aligned axially along the pipe 104 and being positioned between the first and second spatial arrays 110 and 202. FIG. 5 depicts a transverse (radial) cross-section view of this embodiment. The sensors 112 in each additional array 210 provide analog pressure time-varying signals $P_1(t), P_2(t), P_3(t) \ldots P_N(t)$ to one or more signal processors 114, which determines flow velocity of the fluid proximate each additional array 210. Optionally, each array 210 may comprise a pair of sensors 112 disposed on the pipe 104 at a corresponding level between the top and bottom arrays 110 and 202, as indicated at 211-217. These optional sensors 112 are shown in phantom in FIG. 5. For each array, the signals output from the pair of sensors 112 at corresponding height locations (212-216) are combined (e.g., summed) as a single input to the signal processor 114 to eliminate portions of the signal caused by horizontal bending modes of the pipe 104.

Figure 6:
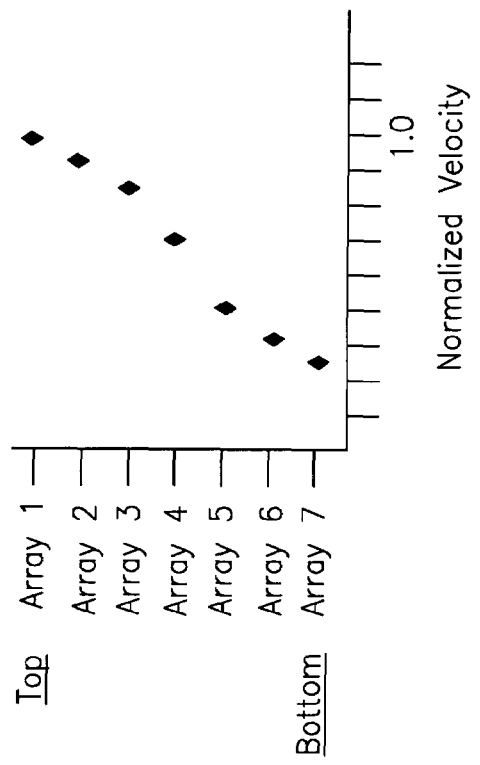
FIG. 6 depicts a plot of the normalized velocity for the plurality of arrays in the embodiment of FIG. 5.

FIG. 6 depicts a plot of the normalized velocity for each array 110, 202, and 210. As in the example of FIG. 3, the ratio of the velocities near the top and bottom of the pipe 104 correlates to the level of stratification of the flow 102. The additional arrays 210 allow a velocity profile to be constructed, with the number of data points in the profile being equal to the number of arrays 110, 202 and 210. Comparing the velocity profiles of FIG. 3 and FIG. 6, it can be seen that the additional arrays 210 used to create the profile of FIG. 6 allow for a more accurate representation of the velocities at different height locations 211-217 in the pipe 104 than the straight line approximation of FIG. 3. The additional sensor arrays may also provide a more accurate determination of the level of stratification by comparing the flow rates of each of the arrays 110, 202, and 210 disposed circumferentially around the pipe.

As can be seen in the velocity profile of FIG. 6, the extreme top and bottom velocity readings (the velocity readings at arrays 1 and 7, respectively) tend to be the most diverse, with the reading at the transverse sides of the pipe 104 (the reading at array 4) providing a nominal velocity for the entire profile. Accordingly, it can be seen that for measuring nominal velocity in stratified flow using an array of sensors, it may be advantageous to sense unsteady pressures along the transverse sides of the pipe 104, such that the areas of extreme diversity in velocity (i.e., the top and bottom of the pipe 104) are ignored. For example, the center-most array (array 4) may be used to determine the nominal velocity of the flow 102, or the center-most arrays (e.g., arrays 3, 4, and 5) can be used to determine the nominal velocity of the flow 102. The present invention also contemplates that any array offset from the center horizontal array (i.e., array 4), such as arrays 3 and 5 or combinations of other arrays (e.g., arrays 2 & 3 or arrays 5 & 6) may be used to determine the nominal or average velocity of the process flow 102. The determination of which array or set of arrays to determine the nominal velocity is dependent on the level of stratification.

The invention further contemplates that the velocity measurements from all the sensor arrays may be used to determine the average velocity of the fluid flow 102 in the pipe 104. The average flow rate may be determined by simply averaging the sum of all the velocities at each height measured by each respective array of sensors. Alternatively, the output of each sensor or sensor array may be weighted depending on the location (or height) of the sensor on the pipe 104. For example, sensors (sensor arrays 1 and 7) disposed at the top or bottom of the pipe 104 are weighted less than the sensors (sensor arrays 3-5) disposed near the center of the pipe 104. Each sensor may be weighted by the volumetric flow that the sensor at a particular height is measuring (or the distance between inner walls of the pipe 104 at the respective height). For instance, sensors disposed closer to the center of the pipe 104 are weighted more than those weighted closer to the top and bottom of the pipe 104. Alternatively, the sensors may be disposed circumferentially around the pipe 104 at locations wherein weighting of the sensors is not needed. For instance, each sensor measures a similar amount of volumetric flow. This can be achieved by the location of the sensor and the length of the sensor material. For example, sensors located closer to the tops and bottoms of the pipe 104 may be longer circumferentially around the pipe 104 than the sensors disposed closer to the center of the pipe 104. Averaging of the signals from the sensors or array of sensors reduces noise on the signals.

The invention also contemplates that the sensor or sensor arrays disposed at different heights may be weighted, wherein the weighting is dependent on the level or degree of stratification. For instance, the sensors located near the top of the pipe 104 may be weighted greater than the weighting of sensors disposed near the bottom of the pipe 104.

The sensors may also be weighted based on other characteristics of the fluid flow, such as the presence of rocks and sand traveling along the bottom of the pipe 104.

One should appreciate that the weighting of the output signal of the sensors may be dependent on any one or combination of the location (i.e., height location) of the sensor(s), the volume of flow 102 each sensor is sensing, the degree of stratification, and other characteristics of the flow 102.

The invention further contemplates that the weighting of sensors used in determining the average flow rate or degree of stratification may be dynamic dependent of the conditions provided herein before. In other words, the number of sensors used, the height location of the sensors, and the weighting of the sensors may be dynamically changed by selecting the desired outputs of the sensors and/or changing the weighting of the outputs of the sensors in response to any one or combination of the location (i.e., height location) of the sensor(s), the volume of flow 102 each sensor is sensing, the degree of stratification, and other characteristics of the flow 102.

Alternative, the sensor or sensor arrays may be effectively weighted by spacing the sensors around the pipe 104 and/or varying the circumferential length of the sensors such that each sensor array measures approximately the same volume of fluid flowing in the pipe 104. In this instance, weight of the output signals or velocity is not necessary. It is contemplated that both methods of weighting may be use.

As will be described in further detail hereinafter, the presence and level of settlement of solids on the bottom or against the inner wall of the pipe 104 may be determined knowing the flow rates at each level 211-217 of the multiphase mixture 102 flowing within the pipe.

Figure 8:
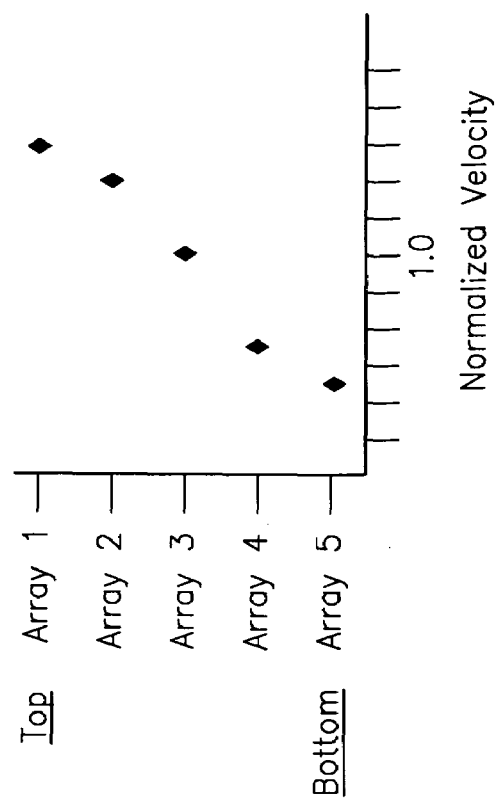
FIG. 8 depicts a plot of the normalized velocity for the plurality of arrays in the embodiment of FIG. 7.
Figure 7:
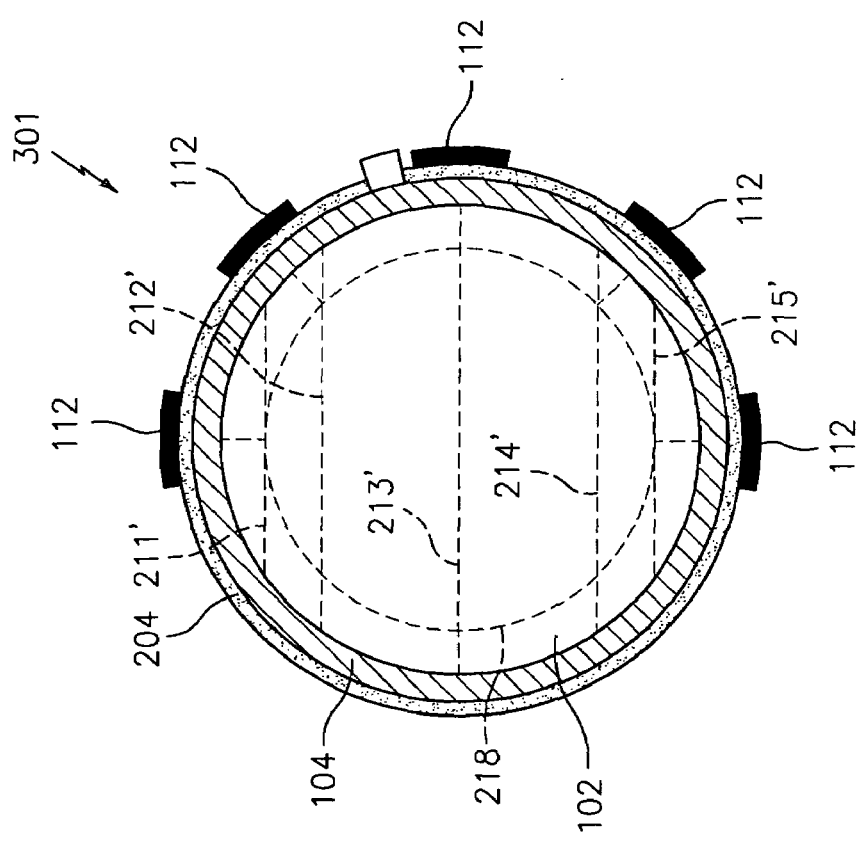
FIG. 7 depicts a transverse (radial) cross-section of another embodiment of the present invention similar to that shown in FIG. 5 having five arrays disposed on one side of the pipe.

FIG. 7 is another embodiment of the present invention similar to that shown in FIGS. 4 and 5. The difference is that the embodiment of the apparatus 301 has five (5) sensors disposed circumferentially on each sensor band. The sensors (PVDF film) are equally spaced circumferentially around half of the pipe 104. FIG. 8 shows a plot of the normalized velocity sensed at each height by the respective array of sensors, similar to that shown in FIG. 6.

As shown in FIG. 7, each array of sensors (array 1-5) measures the velocity of the fluid flow 102 at a location within the flow at a depth of measurement 218 (dashed circle). As depicted in FIG. 7, the depth of measurement is about 20% of the radius of the pipe 104. The depth of measurement 218 is also indicative of the location where the strongest vortical disturbances are typically located within the flow 102. However, one will appreciate that the vortical disturbance may be located closer or further from the inner wall of the pipe 104 depending on the characteristics/properties of the fluid flow 102, such as the viscosity, flow rate, pipe material, fluid composition, etc. One significance of knowing where each sensor measures the vortical disturbances is to determine the height within the pipe 104 that the sensor is measuring. Therefore, as one can see from FIG. 7 the height (or level within the pipe) 211'-215' associated with each sensor 112 (except the array 3 at level 213') is offset from the center of the sensor array. Knowing the actual level 211'-215' that each sensor measures enables a more accurate weighting of the sensors as described herein before, a more accurate measurement of the level of the settlement of solids, and desired position of the sensors array around the circumference of the pipe 102.

Figure 9:
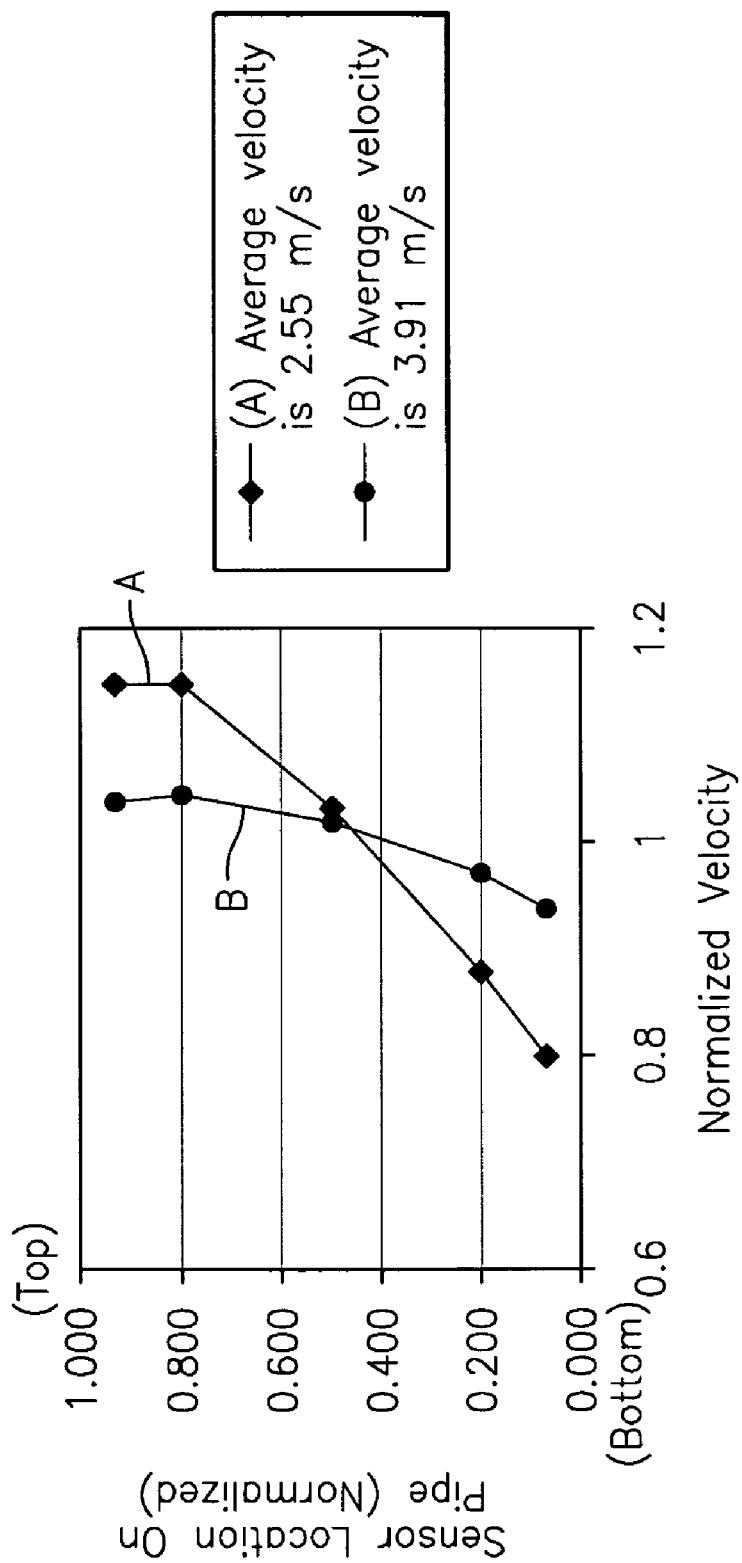
FIG. 9 depicts a plot data showing the normalized velocity sensed by each array of FIG. 7 when no settlement of particles is present in accordance with the present invention.

As shown in FIG. 9, two measurements are provided for a multiphase fluid flow flowing at different velocities that results in each flow having a different velocity profile and level of stratification, as described herein before. The plots A and B illustrate that as the velocity of the fluid decreases, the level of stratification increases and the flow rate at the bottom portion of the pipe slows down as the solids or particles in the multiphase flow 102 start to settle towards the bottom of the flow. As shown in plot A, the multiphase fluid flow has an average velocity of 2.55 m/s. As shown, the velocity of the upper portion of the fluid flow 102 (recorded by the top two sensors) is much faster than the velocity of the bottom portion of the fluid flow 102 (recorded by the bottom two sensors). This difference provides a measurement of the degree of stratification of the fluid flow 102. In plot B, the multiphase fluid flow has an average velocity of 3.91 m/s. As shown the difference in the velocity of the upper portion and the lower portion of the fluid flow is much less than that shown in plot B, and therefore the stratification of the flow depicted in plot A is less than that of plot B. One can appreciate that the greater number of sensor(s) on one side of the pipe 104 can provide a detail plot or characterization of the flow profile (e.g., velocity profile). As will be discussed herein after, neither Plot A or B are indicative of solids settling on the bottom of the pipe 102.

Figure 10:
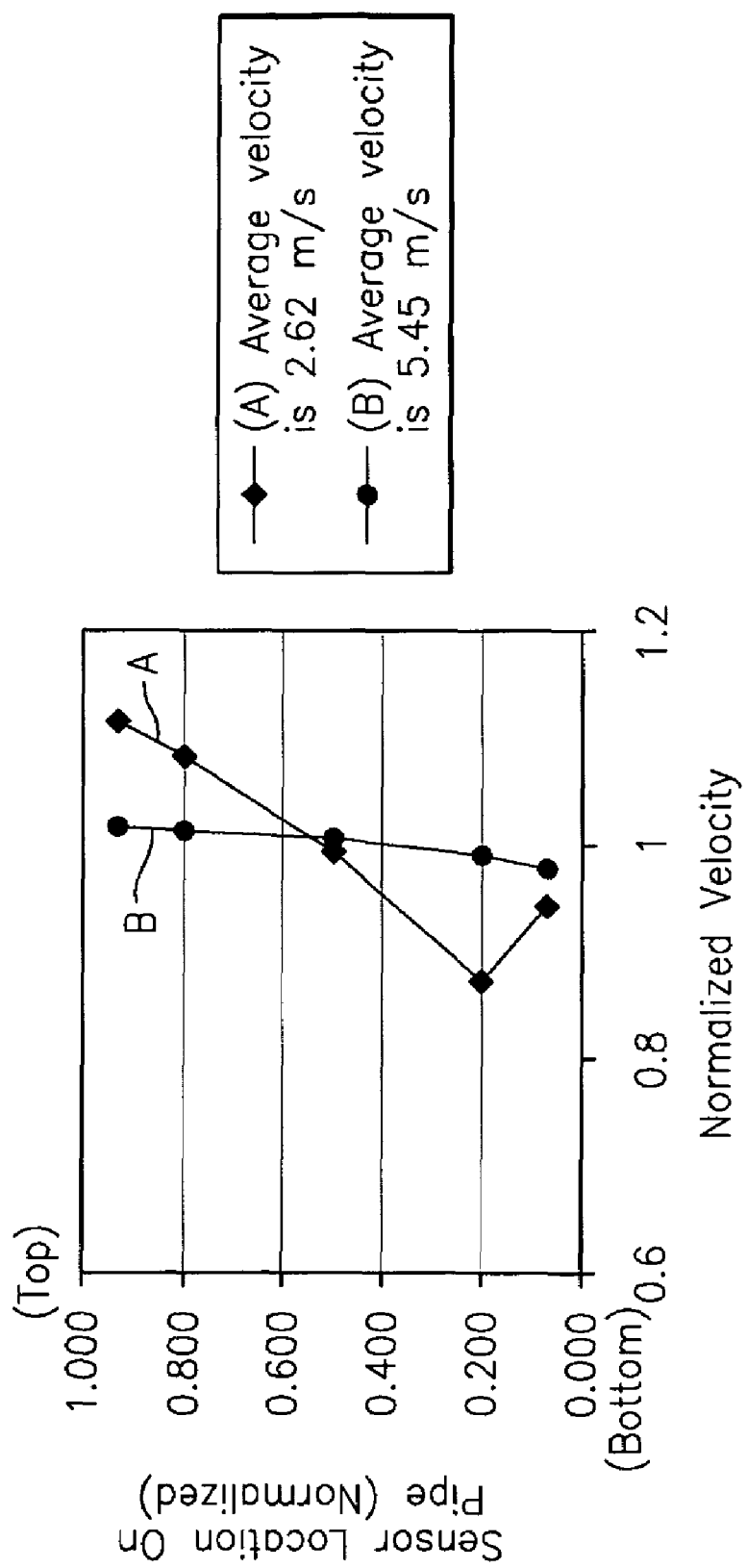
FIG. 10 depicts a plot data showing the normalized velocity sensed by each array of FIG. 7 when settlement of particles is present in accordance with the present invention.

FIG. 10 shows a pair of plots of a multiphase fluid flow flowing through a pipe at two different velocities similar to that shown in FIG. 9 using the apparatus 301. Plot B shows a fluid flow 102 having an average velocity of 5.45 m/s, and having a relatively uniform flow profile with little stratification. In contrast, Plot A shows a stratified multiphase fluid flow 102 having an average velocity of 2.62 m/s. Plot A further illustrates a multiphase flow 102 wherein the solids within the multiphase mixture 102 have settled to the bottom of the pipe to create a relative settled bed of solids. This phenomenon is illustrated by the bottom sensor array in Plot A showing a higher velocity than the sensor array disposed above and adjacent to the bottom sensor. This phenomenon indicates that settling of solids (e.g., sanding) has occurred within the pipe 104. Sanding is defined as solids (e.g., sand particles) within a multiphase fluid flow that have settled or nearly settled at the bottom of the pipe, which may result in partially blocking and possibly clogging of the pipe 104. As such, the term sanding is typically used when sand particles are present and stationary or nearly stationary (i.e. moving very slowly relative to the flow) at the bottom of a pipe.

Sanding is a concern for processes, such as hydrotransport lines, which use liquid to transport mineral(s). While one might anticipate that when sanding occurs the velocity measured by the bottom array of sensors would indicate a very low velocity or zero velocity, the measured velocity at the lowest sensor array actually increases (as noted in Plot A of FIG. 10). It is believed that the sensor arrays 112, such as the bottom array, continue to measure the velocity of the fluid flow 102 above the sand portion settled on the bottom of the pipe 104 at the depth of measurement 218 relative to the settled sand (or solids). Hence the fluid is measured at a higher point in the pipe 104, and thus resulting in a higher velocity than previously measured before the settling of the sand on the bottom of the pipe.

It is believed that not only will the present invention provide a means to detect the state of settlement of solids on the bottom of the pipe (e.g., sanding), but also may provide a means for anticipating when sanding occurs as well as the degree or level of sanding on the bottom of the pipe. As the fluid becomes more stratified, the velocity of the fluid flow 102 measured by the lower sensors (particularly the bottom sensor) will decrease. However, when the flow 102 begins to sand or settle at the bottom of the pipe, the velocity of the bottom sensor will begin to increase as the bottom sensor measures the fluid at increasingly higher heights above the settled sand bed. The array of lower sensors, particularly the bottom sensors, will be able to determine the height or level of the sanding by correlating the increase of the velocity of the bottom array(s) with the level of sanding. One should appreciate that this capability to sense the onset as well as the level of sanding enables a control system or user to increase the velocity of the fluid flow 102 to prevent or eliminate the sanding condition. For example, the user can increase the flow rate of the fluid flow to reduce the level of settled solids and/or remove the settle solids. The user may also reduce the velocity of the fluid flow to a velocity to just sufficient to prevent sanding to reduce power consumption.

It is contemplated that the increase in the velocity of the bottom sensor array may increase as the stratification profile changes, which would not be an indication that the fluid flow is sanding. Therefore, sanding may be a function of the increase of the velocity of the bottom sensor array and the degree or change in stratification. For instance, an increase in the bottom velocity with a reduction of stratification would not indicate sanding. However, an increase in the bottom velocity with a high degree of stratification or minimal change in stratification would indicate the existence or onset of a sanding condition. In either instance, when a velocity of a lower array of sensors is greater than or equal to the velocity of an upper array of sensors, a sanding condition is present. More generally, the condition of solids settled on the inner wall of a pipe is detected when there is an uncharacteristic increase in the velocity of the lower portion of the fluid flow. In other words, when the characteristics of the lower portion of the velocity profile of a fluid flow is unusual, abnormal or not expected, this abnormal or uncharacteristic feature of the velocity profile is an indication of sanding.

Figure 11:
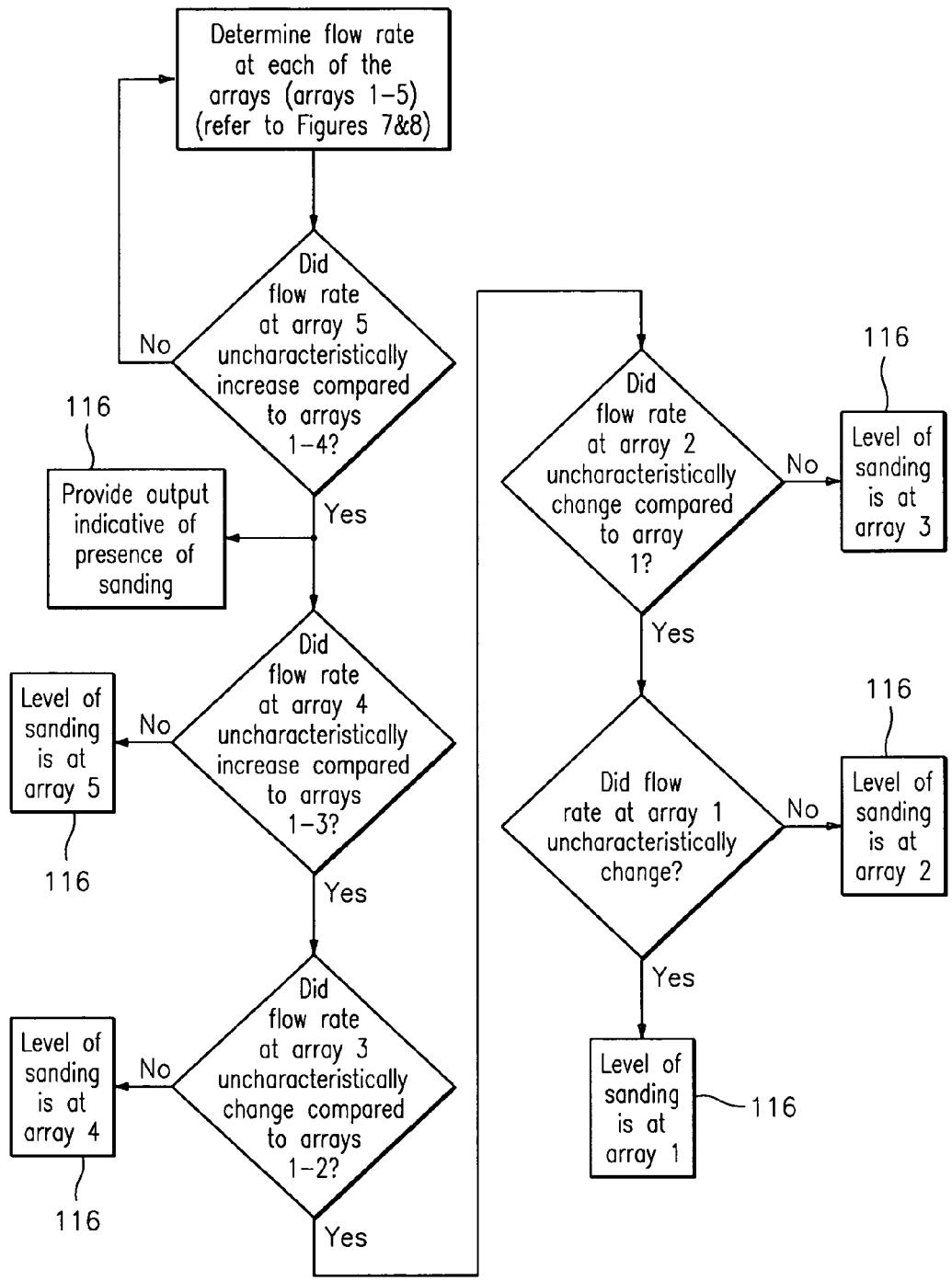
FIG. 11 is a block diagram illustrating one embodiment of a method for determining the presence and level of sanding in accordance with the present invention.

For example, referring to FIGS. 11 and 7, one method for determining the presence and/or level of sanding involves determining the flow rate at each of the arrays 1-5. The flow rates are then examined to determine whether the flow rate at array 5 has uncharacteristically increased as compared to arrays 1-4. If there has been no change in the flow rate at array 5, then the flow rates for the arrays 1-5 are monitored, either continuously or at periodic intervals. However, if the flow rate at array 5 has changed, then an indication of the presence of sanding is provided to a user via an audible and/or a display device, and the remaining flow rates are examined to determine whether the flow rate at array 4 has uncharacteristically increased as compared to arrays 1-3.

At this point, if there has been no change in the flow rate at array 4, then it is determined that the level of sanding is at the level of array 5. However, if the flow rate has changed, then the remaining flow rates are examined to determine whether the flow rate at array 3 has uncharacteristically changed as compared to arrays 1-2. If there has been no change in the flow rate at array 3, then it is determined that the level of sanding is at the level of array 4. If the flow rate at array 3 has changed, then the remaining flow rates are examined to determine whether the flow rate at array 2 has uncharacteristically changed as compared to array 1, where if there has been no change in the flow rate at array 2, then it is determined that the level of sanding is at the level of array 3. Similar to the above, if the flow rate at array 2 has changed then the flow rate at array 1 is examined for an uncharacteristic change in flow. If there has been no change in the flow rate at array 1, then it is determined that the level of sanding is at the level of array 2. If there has been a change in the flow rate at array 1, then it is determined that the level of sanding is at the level of array 1.

One will appreciate depending on the diameter of the pipe and the depth of the solids settled on the bottom of the pipe that the sensor arrays may not provide any flow rate at all. This is particularly true for sensor disposed above the midpoint of the pipe. As one will recognize, when the level of the solids increase above the sensors disposed above the midpoint of the pipe, the sensors will not longer measure the fluid flow because only solids is disposed within is direction of measurement, which is orthogonal to the position of the sensor.

Figure 12:
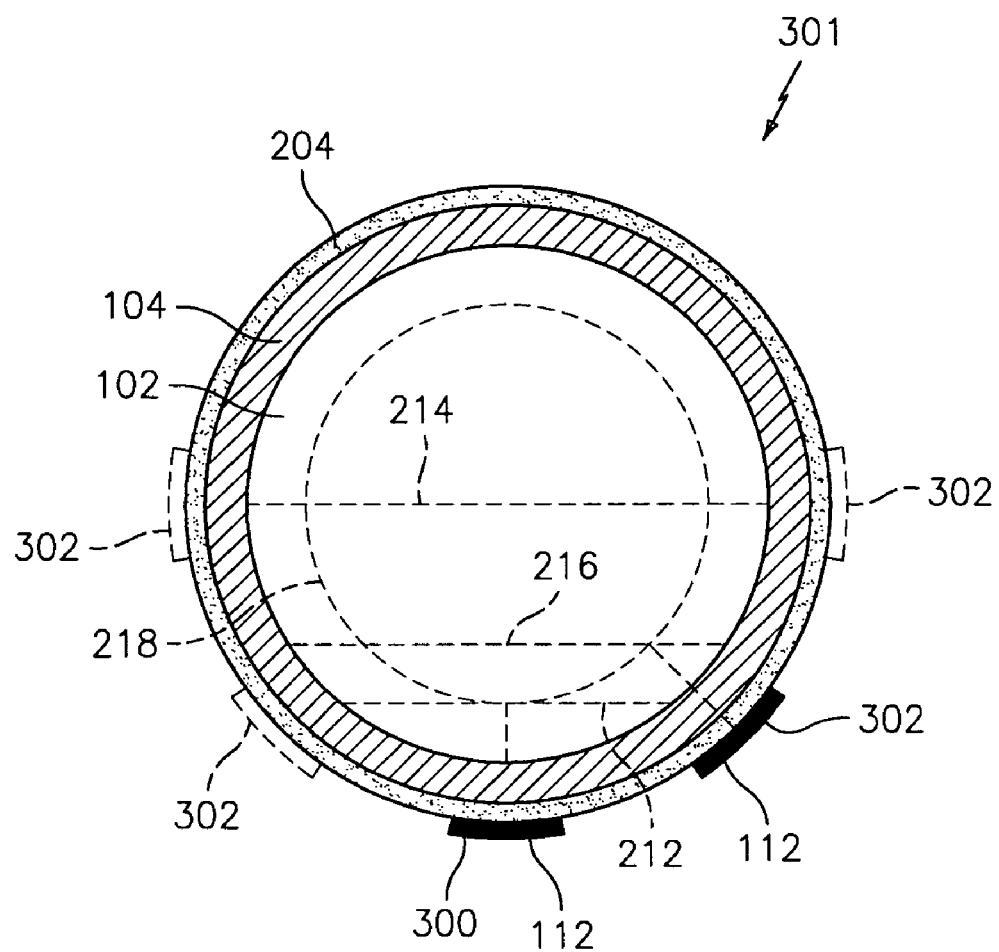
FIG. 12 depicts a transverse (radial) cross-section of another embodiment of the present invention similar to that shown in FIG. 7 having two arrays.

FIG. 12 illustrates still another embodiment of the present invention similar to that shown in FIG. 7. The difference is that this embodiment of the meter has two (2) sensors 112 disposed on each sensor band, wherein one of the sensors 300 is disposed on the bottom portion of the portion of the pipe and the other sensor 302 is disposed in an offset location adjacent to the sensor 300. This allows the sensor 300 disposed at the bottom portion of the pipe 104 to sense the velocity of the flow in an area near the bottom of the pipe 104 while the other sensors 302 sense the velocity of the flow higher up into the pipe 104. As suggested herein before, in contrast to the embodiment in FIG. 2, this configuration will enable both a measurement of the presence of sanding in the pipe 104 and the level (at 212 or 216) of the solids settle on the bottom of the pipe. The ability of this configuration to measure level of the settled solids is related to the close proximity of the sensors 302 to the sensors 300. The relative close proximity of the sensors 300, 302 provides a meaningful comparison between the two measured velocities to enable detection of the level of sanding. It is contemplated that other configurations of this embodiment may also be used. For example, the sensor 302 may be disposed in various other locations on the pipe 104 as shown by the dotted lines in FIG. 12.

As discussed hereinbefore referring to FIGS. 7-10, the present invention also contemplates that any array offset from the center horizontal array (i.e., array 4), such as arrays 3 and 5 or combinations of other arrays (e.g., arrays 2 & 3 or arrays 5 & 6) may be used to determine the nominal or average velocity of the process flow 102. It should be appreciated that the determination of which array or set of arrays may be used to determine the nominal velocity is dependent on the level of stratification. It is further contemplated that the selected arrays for determining the nominal velocity and volumetric flow of the process fluid may be dynamically selected in response to the measured level of stratification.

While the embodiments described of the present invention show the sensor arrays to be equally spaced around the circumference of the pipe, the present invention contemplates that the sensors arrays may not be equally spaced, nor do the sensors have to be disposed on any particular portio of the pipe. It is contemplated that the sensor arrays may be only disposed on the upper half of the pipe or not include a sensor array at the bottom of the pipe.

Referring to FIG. 1b, the flow logic may determine the velocity of each array of sensors 110, 202 using one or both of the following techniques to determine the convection velocity of the vortical disturbances within the process flow 102 by:
1) Characterizing the convective ridge of the vortical disturbances using an array of unsteady pressure sensors.
2) Cross-correlating unsteady pressure variations using an array of unsteady pressure sensors.

The flow logic 124 in FIG. 13 is used to characterize the convective ridge of the unsteady pressures and determine the flow rates. As shown in FIG. 13, the flow logic 124 includes a data acquisition unit 126 (e.g., A/D converter) that converts the analog signals $P_1(t) \ldots P_N(t)$ to respective digital signals and provides the digital signals $P_1(t) \ldots P_N(t)$ to FFT logic 128. The FFT logic 128 calculates the Fourier transform of the digitized time-based input signals $P_1(t) \ldots P_N(t)$ and provides complex frequency domain (or frequency based) signals $P_1(\omega), P_2(\omega), P_3(\omega), \ldots P_N(\omega)$ indicative of the frequency content of the input signals. It should be appreciated that instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

One technique of determining the convection velocity of the coherent structures (e.g., turbulent eddies) 108 within the flow 102 is by characterizing a convective ridge of the resulting unsteady pressures using an array 110 of sensors 112 or other beam forming techniques, similar to that described in U.S. patent application Ser. No. 09/729,994, filed Dec. 4, 2000, now U.S. Pat. No. 6,609,069, which is incorporated herein by reference in its entirety.

A data accumulator 130 accumulates the frequency signals $P_1(\omega)$-$P_N(\omega)$ over a sampling interval, and provides the data to an array processor 132, which performs a spatial-temporal (two-dimensional) transform of the sensor data, from the x-t domain to the k-ω domain, and then calculates the power in the k-ω plane, as represented by a k-ω plot.

The array processor 132 may use standard so-called beam forming, array processing, or adaptive array-processing algorithms, i.e. algorithms for processing the sensor signals using various delays and weighing to create suitable phase relationships between the signals provided by the different sensors, thereby creating phased antenna array functionality. In other words, the beam forming or array processing algorithms transform the time domain signals from the sensor array 110 into their spatial and temporal frequency components, i.e. into a set of wave numbers given by $k=2\pi/\lambda$, where $\lambda$ is the wavelength of a spectral component, and corresponding angular frequencies given by $\omega=2\pi v$.

It should be appreciated that the prior art teaches many algorithms of use in spatially and temporally decomposing a signal from a phased array of sensors, and the present invention is not restricted to any particular algorithm. One particular adaptive array processing algorithm is the Capon method/algorithm. While the Capon method is described as one method, the present invention contemplates the use, or combined use, of other adaptive array processing algorithms, such as MUSIC algorithm. The present invention recognizes that such techniques can be used to determine flow rate, i.e. that the signals caused by a stochastic parameter convecting with a flow 102 are time stationary and may have a coherence length long enough so that it is practical to locate sensors 112 apart from each other and yet still be within the coherence length.

Convective characteristics or parameters have a dispersion relationship that can be approximated by the straight-line equation, $k=\omega/u$, where u is the convection velocity (flow velocity). A k-ω plot is a plot of k-ω pairs obtained from a spectral analysis of sensor samples associated with convective parameters that are portrayed so that the energy of the disturbance spectrally corresponds to pairings that might be described as a substantially straight ridge, wherein the ridge, in turbulent boundary layer theory, is called a convective ridge.

To calculate the power in the k-ω plane, as represented by a k-ω plot (see FIG. 14) of either the signals, the array processor 132 determines the wavelength and so the (spatial) wavenumber k, and also the (temporal) frequency and so the angular frequency ω, of various of the spectral components of the stochastic parameter. There are numerous algorithms available in the public domain to perform the spatial/temporal decomposition of arrays of sensors 112.

The present embodiment may use temporal and spatial filtering to precondition the signals to effectively filter out the common mode characteristics, Pcommon mode and other long wavelength (compared to the sensor spacing) characteristics in the pipe 104 by differencing adjacent sensors 112 and retaining a substantial portion of the stochastic parameter associated with the flow field and any other short wavelength (compared to the sensor spacing) low frequency stochastic parameters.

Figure 14:
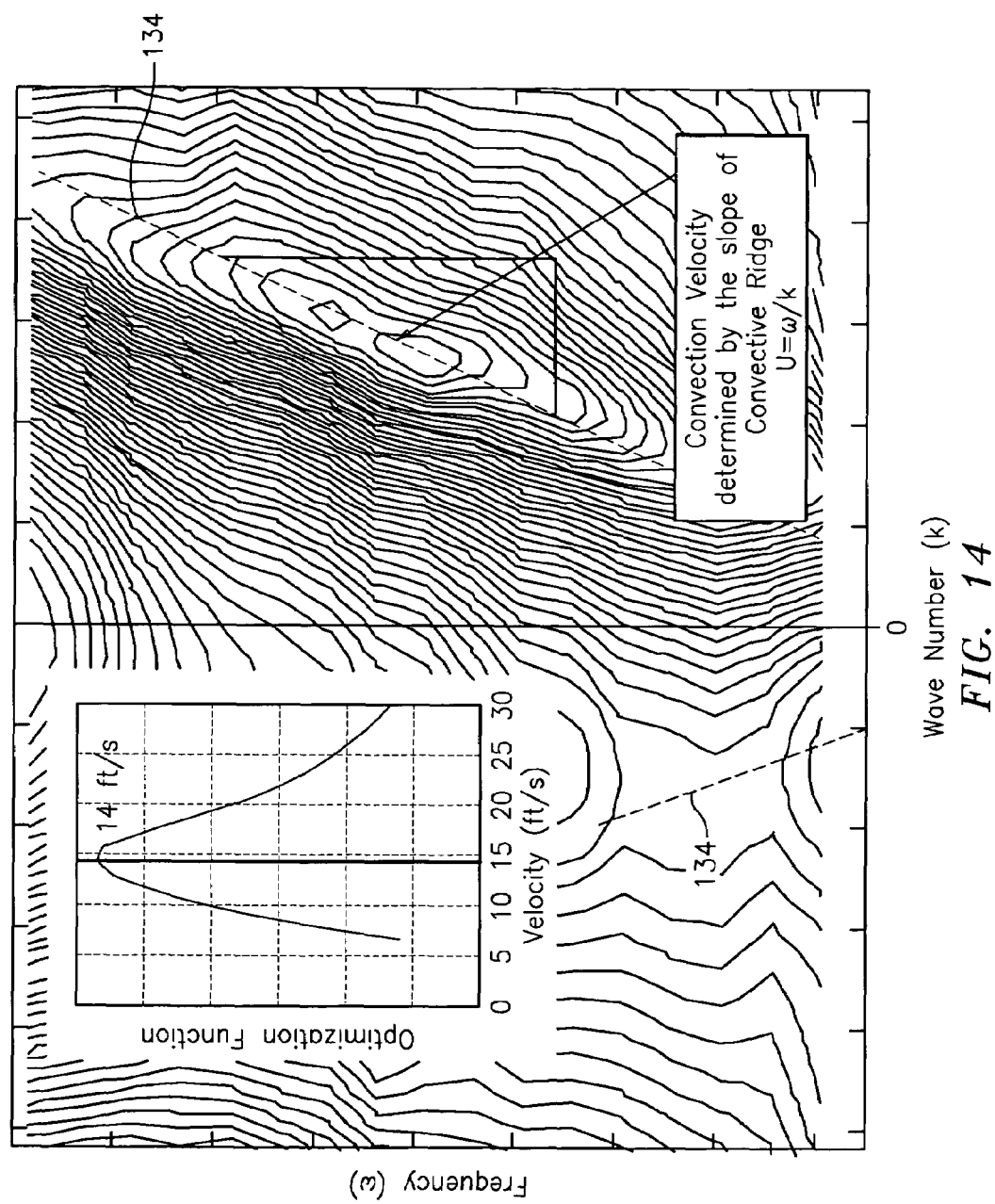
FIG. 14 is a k-ω plot of data processed from an apparatus embodying the present invention that illustrates slope of the convective ridge, and a plot of the optimization function of the convective ridge.

In the case of suitable coherent structures 108 being present, the power in the k-ω plane shown in the k-ω plot of FIG. 14 shows a convective ridge 134. The convective ridge 134 represents the concentration of a stochastic parameter that convects with the flow 102 and is a mathematical manifestation of the relationship between the spatial variations and temporal variations described above. Such a plot will indicate a tendency for k-ω pairs to appear more or less along a line 134 with some slope, wherein the slope indicates the flow velocity.

Once the power in the k-ω plane is determined, a convective ridge identifier 136 uses one or another feature extraction method to determine the location and orientation (slope) of any convective ridge 134 present in the k-ω plane. In one embodiment, a so-called slant stacking method is used, a method in which the accumulated frequency of k-ω pairs in the k-ω plot along different rays emanating from the origin are compared, each different ray being associated with a different trial convection velocity (in that the slope of a ray is assumed to be the flow velocity or correlated to the flow velocity in a known way). The convective ridge identifier 136 provides information about the different trial convection velocities, information referred to generally as convective ridge information.

The analyzer 138 examines the convective ridge information including the convective ridge orientation (slope). Assuming the straight-line dispersion relation given by k=ω/u, the analyzer 138 determines the flow velocity and/or volumetric flow, which are output as parameters 116. The volumetric flow is determined by multiplying the cross-sectional area of the inside of the pipe 104 with the velocity of the process flow 102.

As previously noted, for turbulent Newtonian fluids, there is typically not a significant amount of dispersion over a wide range of wavelength-to-diameter ratios. As a result, the convective ridge 134 in the k-ω plot is substantially straight over a wide frequency range and, accordingly, there is a wide frequency range for which the straight-line dispersion relation given by k=ω/u provides accurate flow velocity measurements.

For stratified flows, however, some degree of dispersion exists such that coherent structures 108 convect at velocities which depend on their size. As a result of increasing levels of dispersion, the convective ridge 134 in the k-ω plot becomes increasingly non-linear.

2) Cross-correlating unsteady pressure variations using an array of unsteady pressure sensors.

The flow logic 124 in FIG. 15 is uses cross-correlation of unsteady pressures to determine the flow rates. The processing unit 118 of FIG. 15 determines the convection velocity of the vortical disturbances within the flow by cross correlating unsteady pressure variations using an array of unsteady pressure sensors, similar to that shown in U.S. Pat. No. 6,889,562, filed Nov. 8, 2001, which is incorporated herein by reference.

Referring to FIG. 15, the processing unit 118 has two measurement regions located a distance ΔX apart along the pipe 104. Each pair of pressure sensors 112 of each region act as spatial filters to remove certain acoustic signals from the unsteady pressure signals, and the distances $X_1, X_2$ are determined by the desired filtering characteristic for each spatial filter, as discussed hereinafter.

In particular, in the processing unit 118, the pressure signal $P_1(t)$ is provided to a positive input of a summer 350 and the pressure signal $P_2(t)$ is provided to a negative input of the summer 350. The output of the summer 350 is provided to line 304 indicative of the difference between the two pressure signals $P_1, P_2$ (e.g., $P_1-P_2=P_{as1}$).

The line 304 is fed to bandpass filter 308, which passes a predetermined passband of frequencies and attenuates frequencies outside the passband. In accordance with the present invention, the passband of the filter 308 is set to filter out (or attenuate) the dc portion and the high frequency portion of the input signals and to pass the frequencies therebetween. Other passbands may be used in other embodiments, if desired. Passband filter 208 provides a filtered signal $P_{asf}1$ on a line 312 to Cross-Correlation Logic 316, described hereinafter.

The pressure signal $P_3(t)$ is provided to a positive input of a summer 313 and the pressure signal $P_4(t)$ is provided to a negative input of the summer 313. The output of the summer 313 is provided on a line 306 indicative of the difference between the two pressure signals $P_3, P_4$ (e.g., $P_3-P_4=P_{as2}$). The line 306 is fed to a bandpass filter 310, similar to the bandpass filter 308 discussed hereinbefore, which passes frequencies within the passband and attenuates frequencies outside the passband. The filter 310 provides a filtered signal $P_{asf}2$ on a line 314 to the Cross-Correlation Logic 316. The signs on the summers 350,313 may be swapped if desired, provided the signs of both summers are swapped together. In addition, the pressure signals $P_1, P_2, P_3, P_4$ may be scaled prior to presentation to the summers 350,313.

The Cross-Correlation Logic 316 calculates a known time domain cross-correlation between the signals $P_{asf1}$ and $P_{asf2}$ on the lines 312,314, respectively, and provides an output signal on a line 318 indicative of the time delay τ it takes for an vortical flow field 108 (or vortex, stochastic, or vortical structure, field, disturbance or perturbation within the flow) to propagate from one sensing region to the other sensing region. Such vortical flow disturbances, as is known, are coherent dynamic conditions that can occur in the flow which substantially decay (by a predetermined amount) over a predetermined distance (or coherence length) and convect (or flow) at or near the average velocity of the fluid flow. As described above, the vortical flow field 108 also has a stochastic or vortical pressure disturbance associated with it. In general, the vortical flow disturbances 108 are distributed throughout the flow, particularly in high shear regions, such as boundary layers (e.g., along the inner wall of the tube 104) and are shown herein as discrete vortical flow fields 108. Because the vortical flow fields (and the associated pressure disturbance) convect at or near the mean flow velocity, the propagation time delay τ is related to the velocity of the flow by the distance ΔX between the measurement regions, as discussed hereinafter.

Referring to FIG. 15, a spacing signal ΔX on a line 320 indicative of the distance ΔX between the sensing regions is divided by the time delay signal τ on the line 318 by a divider 322 which provides an output signal on the line 116 indicative of the convection velocity $U_c(t)$ of the saturated vapor/liquid mixture flowing in the pipe 104, which is related to (or proportional to or approximately equal to) the average (or mean) flow velocity $U_f(t)$ of the flow 102, as defined below:

$$U_C(t)=\Delta X/\tau \propto U_f(t) \qquad \text{Eq. 1}$$

The present invention uses temporal and spatial filtering to precondition the pressure signals to effectively filter out the acoustic pressure disturbances $P_{acoustic}$ and other long wavelength (compared to the sensor spacing) pressure disturbances in the pipe 104 at the two sensing regions and retain a substantial portion of the vortical pressure disturbances $P_{vortical}$ associated with the vortical flow field 108 and any other short wavelength (compared to the sensor spacing) low frequency pressure disturbances $P_{other}$. In accordance with the present invention, if the low frequency pressure disturbances $P_{other}$ are small, they will not substantially impair the measurement accuracy of $P_{vortical}$.

While the cross-correlation was show using four sensors, whereby two sensors were summed together to form a sensing region, the invention contemplates that each sensing region may only comprise of one sensor disposed at an axial location along the pipe 104.

In any of the embodiments described herein, the sensors 112 may include electrical strain gages, optical fibers and/or gratings, ported sensors, among others as described herein, and may be attached to the pipe by adhesive, glue, epoxy, tape or other suitable attachment means to ensure suitable contact between the sensor and the pipe 104. The sensors 112 may alternatively be removable or permanently attached via known mechanical techniques such as mechanical fastener, spring loaded, clamped, clam shell arrangement, strapping or other equivalents. Alternatively, strain gages, including optical fibers and/or gratings, may be embedded in a composite pipe 104. If desired, for certain applications, gratings may be detached from (or strain or acoustically isolated from) the pipe 104, if desired. It is also contemplated that any other strain sensing technique may be used to measure the variations in strain in the pipe 104, such as highly sensitive piezoelectric, electronic or electric, strain gages attached to or embedded in the pipe 104.

In various embodiments of the present invention, a piezoelectronic pressure transducer may be used as one or more of the pressure sensors and it may measure the unsteady (or dynamic or ac) pressure variations inside the pipe 104 by measuring the pressure levels inside the pipe 104. In one embodiment of the present invention, the sensors 112 comprise pressure sensors manufactured by PCB Piezotronics of Depew, N.Y. For example, in one pressure sensor there are integrated circuit piezoelectric voltage mode-type sensors that feature built-in microelectronic amplifiers, and convert the high-impedance charge into a low-impedance voltage output. Specifically, a Model 106B manufactured by PCB Piezotronics is used which is a high sensitivity, acceleration compensated integrated circuit piezoelectric quartz pressure sensor suitable for measuring low pressure acoustic phenomena in hydraulic and pneumatic systems. It has the unique capability to measure small pressure changes of less than 0.001 psi under high static conditions. The 106B has a 300 mV/psi sensitivity and a resolution of 91 dB (0.0001 psi).

The sensors 112 may incorporate a built-in MOSFET microelectronic amplifier to convert the high-impedance charge output into a low-impedance voltage signal. The sensors 112 may be powered from a constant-current source and can operate over long coaxial or ribbon cable without signal degradation. The low-impedance voltage signal is not affected by triboelectric cable noise or insulation resistance-degrading contaminants. Power to operate integrated circuit piezoelectric sensors generally takes the form of a low-cost, 24 to 27 VDC, 2 to 20 mA constant-current supply.

Most piezoelectric pressure sensors are constructed with either compression mode quartz crystals preloaded in a rigid housing, or unconstrained tourmaline crystals. These designs give the sensors microsecond response times and resonant frequencies in the hundreds of kHz, with minimal overshoot or ringing. Small diaphragm diameters ensure spatial resolution of narrow shock waves.

The output characteristic of piezoelectric pressure sensor systems is that of an AC-coupled system, where repetitive signals decay until there is an equal area above and below the original base line. As magnitude levels of the monitored event fluctuate, the output remains stabilized around the base line with the positive and negative areas of the curve remaining equal.

Furthermore, it is contemplated that each of the sensors 112 may include a piezoelectric sensor that provides a piezoelectric material to measure the unsteady pressures of the flow 102. The piezoelectric material, such as the polymer, polarized fluoropolymer, PVDF, measures the strain induced within the process pipe 104 due to unsteady pressure variations within the flow 102. Strain within the pipe 104 is transduced to an output voltage or current by the attached piezoelectric sensors 112.

The PVDF material forming each piezoelectric sensor 112 may be adhered to the outer surface of a steel strap 204 that extends around and clamps onto the outer surface of the pipe 104. The piezoelectric sensing element is typically conformal to allow complete or nearly complete circumferential measurement of induced strain. The sensors can be formed from PVDF films, co-polymer films, or flexible PZT sensors, similar to that described in "Piezo Film Sensors technical Manual" provided by Measurement Specialties, Inc. of Fairfield, N.J., which is incorporated herein by reference. The advantages of this technique are the following:

1. Non-intrusive flow rate measurements
2. Low cost
3. Measurement technique requires no excitation source. Ambient flow noise is used as a source.
4. Flexible piezoelectric sensors can be mounted in a variety of configurations to enhance signal detection schemes. These configurations include a) co-located sensors, b) segmented sensors with opposing polarity configurations, c) wide sensors to enhance acoustic signal detection and minimize vortical noise detection, d) tailored sensor geometries to minimize sensitivity to pipe modes, e) differencing of sensors to eliminate acoustic noise from vortical signals.
5. Higher Temperatures (140C.) (co-polymers)

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It should be understood that any of the features, characteristics, alternatives or modifications described regarding a particular embodiment herein may also be applied, used, or incorporated with any other embodiment described herein. In addition, it is contemplated that, while the embodiments described herein are useful for flow having dispersive properties (e.g., stratified flow), the embodiments described herein can also be used for homogeneous flow with no dispersive properties.

Although the invention has been described and illustrated with respect to exemplary embodiments thereof, the foregoing and various other additions and omissions may be made therein and thereto without departing from the spirit and scope of the present invention.

What is claimed is:

1. An apparatus for measuring a parameter of a flow passing through a pipe, the apparatus comprising:
    a first spatial array of at least two sensors disposed at different axial locations along the pipe, each of the sensors in the first array being positioned at a first radial location on the pipe and providing a first signal indicative of unsteady pressure created by coherent structures convecting with a portion of the flow passing through a first portion of the pipe;
    a second spatial array of at least two sensors disposed at different axial locations along the pipe, each of the sensors in the second array providing a second signal indicative of unsteady pressure created by coherent structures convecting with a portion of the flow passing through a second portion of the pipe, the first portion of the pipe being located above the second portion of the pipe;
    and at least one signal processor configured to:
    determine a first velocity of the flow passing through the first portion of the pipe using the first signals,
    determine a second velocity of the flow passing through the second portion of the pipe using the second signals, and compare the first and second velocities to determine the parameter of the flow.

2. The apparatus of claim 1, wherein the parameter of the flow includes at least one of a level of stratification of the flow and a volumetric flow rate of the flow.

3. The apparatus of claim 1, wherein the signal processor normalizes the first and second velocities before comparing the first and second velocities.

4. The apparatus of claim 1, wherein the signal processor compares the first and second velocities to identify whether the second velocity is larger than the first velocity, wherein a larger second velocity is indicative of stratification of the flow.

5. The apparatus of claim 4, wherein the signal processor identifies the location of the larger second velocity within the pipe, wherein the location of the larger second velocity within the pipe is indicative of the level of stratification of the flow.

6. The apparatus of claim 4, wherein the location of the larger second velocity within the pipe is indicative of the level of stratification of the flow.

7. The apparatus of claim 1, wherein the pipe is parallel to the ground and the first spatial array is aligned axially along a top portion of the pipe and the second spatial array is aligned axially along a bottom portion of the pipe.

8. The apparatus of claim 1, wherein the pipe is parallel to the ground and the first spatial array is aligned axially along a bottom portion of the pipe and the second spatial array is aligned axially along a middle portion of the pipe.

9. The apparatus of claim 1, further comprising:
    at least one additional spatial array of at least two sensors disposed at different axial locations along the pipe, each of the sensors in the at least one additional array being positioned at an additional radial location on the pipe and providing a respective additional signal indicative of unsteady pressure created by coherent structures convecting with a portion of the flow proximate the additional location, the at least one additional spatial array being aligned axially along the pipe and being positioned between the first and second spatial arrays; and
    wherein, for each additional spatial array, the at least one signal processor is further configured to:
    determine an additional velocity of the flow near the additional spatial array using the respective additional signals, and
    compare the first, second, and additional velocities to determine the parameter of the flow.

10. The apparatus of claim 9, wherein the comparison of the first, second, and additional velocities provides a velocity profile of the flow passing through the pipe.

11. The apparatus of claim 9, wherein the parameter of the flow includes at least one of a level of stratification of the flow and a volumetric flow rate of the flow.

12. The apparatus of claim 9, wherein the at least one signal processor normalizes the first, second, and additional velocities before comparing the first, second, and additional velocities.

13. The apparatus of claim 1, wherein the parameter of the flow includes a level of stratification of the flow and wherein, in response to the level of stratification of the flow, the signal processor selects a number of sensors for use in determining a mean velocity of the flow.

14. The apparatus of claim 1, wherein the signal processor is configured to identify an uncharacteristic increase in the second velocity as compared to the first velocity.

15. The apparatus of claim 1, wherein the parameter of the flow includes the presence of solids disposed on an inner surface of the second portion of the pipe.

16. The apparatus of claim 15, wherein the parameter of the flow includes the level of the solids disposed on the inner surface of the second portion of the pipe.

17. An apparatus for measuring a parameter of a flow passing through a pipe, the apparatus comprising:
    at least two spatial arrays each special array comprised of sensors disposed at different axial locations along the pipe and each spatial array being disposed at a different circumferential location about the pipe, wherein each of the sensors provide a signal indicative of unsteady pressure created by coherent structures convecting with the flow within the pipe at a corresponding axial and circumferential location of the pipe;
    and a signal processor configured to identify a greater convection velocity and a location of the greater convection velocity, wherein the greater convection velocity is indicative of stratification of the flow and wherein the location of the greater convection velocity is indicative of a level of the stratification of the flow.

18. A method for measuring a parameter of a flow passing through a pipe using an apparatus comprising a first spatial array of at least two sensors disposed at different axial locations along the pipe, each of the sensors in the first array being positioned at a first radial location on the pipe and providing a first signal indicative of unsteady pressure created by coherent structures convecting with a portion of the flow passing through a first portion of the pipe, a second spatial array of at least two sensors disposed at different axial locations along the pipe, each of the sensors in the second array being positioned at a second radial location on the pipe that is different than the first radial location, and providing a second signal indicative of unsteady pressure created by coherent structures convecting with a portion of the flow passing through a second portion of the pipe, and at least one signal processor, wherein the method comprises:

determining a first velocity of the flow passing through the first portion of the pipe using the first signals, determining a second velocity of the flow passing through the second portion of the pipe using the second signals, and comparing the first and second velocities to determine the parameter of the flow.

19. The method of claim 18, wherein the parameter of the flow includes at least one of a level of stratification of the flow and a volumetric flow rate of the flow.

20. The method of claim 18, wherein comparing includes normalizing the first and second velocities.

21. The method of claim 18, wherein comparing includes comparing the first and second velocities to identify whether the second velocity is larger than the first velocity, wherein a larger second velocity is indicative of stratification of the flow.

22. The method of claim 21, wherein comparing further includes identifying the location of the larger second velocity within the pipe, the location of the larger second velocity within the pipe being indicative of the level of stratification of the flow.

23. The method of claim 21, wherein the location of the larger second velocity within the pipe is indicative of the level of stratification of the flow.

24. The method of claim 18, wherein the pipe is positioned parallel to the ground and the first spatial array is aligned axially along a top portion of the pipe and the second spatial array is aligned axially along a bottom portion of the pipe.

25. The method of claim 18, wherein the pipe is positioned parallel to the ground and the first spatial array is aligned axially along a bottom portion of the pipe and the second spatial array is aligned axially along a middle portion of the pipe.

26. The method of claim 18, further comprising:

disposing at least one additional spatial array of at least two sensors at different axial locations along the pipe, each of the sensors in the at least one additional array being positioned at an additional radial location on the pipe and providing a respective additional signal indicative of unsteady pressure created by coherent structures convecting with a portion of the flow proximate the sensor, the at least one additional spatial array being aligned axially along the pipe and being positioned between the first and second spatial arrays; and wherein, for each additional spatial array:

determining an additional velocity of the flow near the additional spatial array using the respective additional signal, and comparing the first, second, and additional velocities to determine the parameter of the flow.

27. The method of claim 26, wherein comparing the first, second, and additional velocities includes generating a velocity profile of the flow passing through the pipe.

28. The method of claim 26, wherein the parameter of the flow includes at least one of a level of stratification of the flow and a volumetric flow rate of the flow.

29. The method of claim 26, further comprising normalizing the first, second, and additional velocities before comparing the first, second, and additional velocities.

30. The method of claim 18, wherein the parameter of the flow includes a level of stratification of the flow and in response to the level of stratification of the flow, selecting a number of sensors for use in determining a mean velocity of the flow.

31. The method of claim 18, further comprising identifying an uncharacteristic increase in the second velocity as compared to the first velocity.

32. The method of claim 18, wherein the parameter of the flow includes the presence of solids disposed on an inner surface of the second portion of the pipe.

33. The method of claim 32, wherein the parameter of the flow includes the level of the solids disposed on the inner surface of the second portion of the pipe.

34. An apparatus for measuring a parameter of a flow passing through a pipe, the apparatus comprising:

a first spatial array of at least two sensors disposed at different axial locations along the pipe, each of the sensors in the first array providing a first signal indicative of unsteady pressure created by coherent structures convecting with a portion of the flow passing through a first portion of the pipe;

a second spatial array of at least two sensors disposed at different axial locations along the pipe, each of the sensors in the second array providing a second signal indicative of unsteady pressure created by coherent structures convecting with a portion of the flow passing through a second portion of the pipe, the first portion of the pipe being located at a different radial location from the second portion of the pipe; and at least one signal processor configured to:

determine a first velocity of the flow passing through the first portion of the pipe using the first signals, determine a second velocity of the flow passing through the second portion of the pipe using the second signals, and compare the first and second velocities to determine the parameter of the flow.

35. The apparatus of claim 34, wherein the signal processor compares the first and second velocities to determine the whether there is stratification of the flow.

36. A method for measuring a parameter of a flow passing through a pipe using an apparatus comprising a first spatial array of at least two sensors disposed at different axial locations along the pipe, each of the sensors in the first array providing a first signal indicative of unsteady pressure created by coherent structures convecting with a portion of the flow passing through a first portion of the pipe, a second spatial array of at least two sensors disposed at different axial locations along the pipe, each of the sensors in the second array providing a second signal indicative of unsteady pressure created by coherent structures convecting with a portion of the flow passing through a second portion of the pipe, the first portion of the pipe being located at a different radial location from the second portion of the pipe, wherein the method comprises:

determining a first velocity of the flow passing through the first portion of the pipe using the first signals, determining a second velocity of the flow passing through the second portion of the pipe using the second signals, and comparing the first and second velocities to determine the parameter of the flow.

37. The method of claim 36, comprising determining whether the flow is stratified.

* * * * *